(12) United States Patent
Gorin et al.

(10) Patent No.: US 12,204,910 B2
(45) Date of Patent: Jan. 21, 2025

(54) MODULAR PIPELINES FOR ACCESSING DIGITAL DATA

(71) Applicant: Bevara Technologies, LLC, Watertown, MA (US)

(72) Inventors: Jerome Gorin, Paris (FR); Maja Bystrom, Watertown, MA (US)

(73) Assignee: BEVARA TECHNOLOGIES, LLC, Watertown, MA (US)

( * ) Notice: Subject to any disclaimer, the term of this patent is extended or adjusted under 35 U.S.C. 154(b) by 0 days.

(21) Appl. No.: 18/126,603

(22) Filed: Mar. 27, 2023

(65) Prior Publication Data
US 2023/0305851 A1 Sep. 28, 2023

Related U.S. Application Data

(60) Provisional application No. 63/326,252, filed on Mar. 31, 2022, provisional application No. 63/324,589, filed on Mar. 28, 2022.

(51) Int. Cl.
*G06F 9/38* (2018.01)
*G06F 9/30* (2018.01)

(52) U.S. Cl.
CPC .......... *G06F 9/382* (2013.01); *G06F 9/30196* (2013.01)

(58) Field of Classification Search
CPC .............................. G06F 9/30196; G06F 9/382
See application file for complete search history.

(56) References Cited

U.S. PATENT DOCUMENTS

| | | | |
|---|---|---|---|
| 5,210,832 A | 5/1993 | Maier et al. |
| 5,987,181 A | 11/1999 | Makiyama et al. |
| 6,026,404 A | 2/2000 | Adunuthula et al. |
| 6,181,711 B1 | 1/2001 | Zhang et al. |
| 6,247,056 B1 | 6/2001 | Chou et al. |
| 6,624,761 B2 | 9/2003 | Fallon |
| 6,845,505 B1 | 1/2005 | Adunuthula et al. |

(Continued)

FOREIGN PATENT DOCUMENTS

| | | |
|---|---|---|
| EP | 1562193 A1 | 8/2005 |
| EP | 1818907 A1 | 8/2007 |

(Continued)

OTHER PUBLICATIONS

Angus, Andrew, "Dropbox: Video Sharing and Photo Sharing Made Easy" [blog post] http://www.switchvideo.com/blog/2011/05/09/dropbox-video-sharing-and-photo-sharing-madeeasy/ May 9, 2011 Switch Video. Retrieved on Mar. 14, 2013.

(Continued)

Primary Examiner — Zachary K Huson
(74) Attorney, Agent, or Firm — Veros Legal Solutions, LLP

(57) ABSTRACT

A data processing system for accessing encoded digital data comprises an accessor pipeline generator. The accessor pipeline generator may comprise an accessor functional unit selector and an accessor functional unit connector. The accessor functional unit selector may iteratively select platform independent accessor functional units from an accessor functional unit library to generate an accessor pipeline. The pipeline may be tested during the process of accessor pipeline generation. The encoded data and the generated accessor pipeline may be stored in a container.

23 Claims, 11 Drawing Sheets

(56) References Cited

U.S. PATENT DOCUMENTS

| | | | |
|---|---|---|---|
| 6,904,176 B1 | 6/2005 | Chui et al. | |
| 7,512,986 B2 | 3/2009 | Shen-Orr et al. | |
| 7,646,432 B2 | 1/2010 | Park et al. | |
| 7,647,619 B2 | 1/2010 | Kashima | |
| 8,527,881 B2 | 9/2013 | Selig | |
| 8,654,901 B2* | 2/2014 | Kim | H04N 21/8193 375/340 |
| 8,995,534 B2 | 3/2015 | Richardson et al. | |
| 8,996,661 B1 | 3/2015 | Kolam et al. | |
| 9,369,717 B2 | 6/2016 | Richardson et al. | |
| 9,578,078 B2 | 2/2017 | Bystrom et al. | |
| 9,645,700 B2 | 5/2017 | Tsai | |
| 9,660,823 B2 | 5/2017 | Zhang et al. | |
| 9,667,685 B2 | 5/2017 | Bystrom et al. | |
| 9,692,787 B1 | 6/2017 | Warner et al. | |
| 9,870,116 B1 | 1/2018 | Yasskin | |
| 10,025,787 B2 | 7/2018 | Bystrom et al. | |
| 10,129,556 B2 | 11/2018 | Gorin et al. | |
| 10,462,216 B1 | 10/2019 | Vysotsky et al. | |
| 10,965,780 B2 | 3/2021 | Gorin et al. | |
| 11,113,329 B2 | 9/2021 | Bystrom et al. | |
| 11,496,585 B2* | 11/2022 | Gorin | H04L 67/303 |
| 11,847,155 B2 | 12/2023 | Bystrom et al. | |
| 11,997,172 B2 | 5/2024 | Gorin et al. | |
| 2002/0010859 A1 | 1/2002 | Maeda | |
| 2002/0018580 A1 | 2/2002 | Maeda | |
| 2002/0035544 A1 | 3/2002 | Wakao et al. | |
| 2002/0087999 A1 | 7/2002 | Kashima | |
| 2003/0002854 A1 | 1/2003 | Belknap et al. | |
| 2003/0018694 A1 | 1/2003 | Chen et al. | |
| 2003/0145338 A1 | 7/2003 | Harrington | |
| 2003/0149793 A1 | 8/2003 | Bannoura et al. | |
| 2003/0158889 A1 | 8/2003 | Massarani et al. | |
| 2003/0163430 A1 | 8/2003 | Takaku | |
| 2003/0177400 A1 | 9/2003 | Raley et al. | |
| 2003/0193940 A1 | 10/2003 | Kugumiya | |
| 2003/0206717 A1 | 11/2003 | Yogeshwar et al. | |
| 2004/0028141 A1 | 2/2004 | Hsiun et al. | |
| 2004/0059776 A1 | 3/2004 | Pitzel et al. | |
| 2004/0067043 A1 | 4/2004 | Duruoz et al. | |
| 2004/0221143 A1 | 11/2004 | Wise et al. | |
| 2005/0149500 A1 | 7/2005 | Marmaros et al. | |
| 2005/0177626 A1 | 8/2005 | Freiburg et al. | |
| 2005/0283717 A1 | 12/2005 | Giraldo et al. | |
| 2006/0056506 A1 | 3/2006 | Ho et al. | |
| 2006/0087457 A1 | 4/2006 | Rachwalski et al. | |
| 2006/0116966 A1 | 6/2006 | Pedersen et al. | |
| 2006/0123455 A1 | 6/2006 | Pai et al. | |
| 2006/0227815 A1 | 10/2006 | Khan | |
| 2006/0248235 A1 | 11/2006 | Eyer | |
| 2006/0257103 A1 | 11/2006 | Lim et al. | |
| 2006/0288404 A1 | 12/2006 | Kirshnan et al. | |
| 2007/0013562 A1 | 1/2007 | Nagasawa | |
| 2007/0070404 A1 | 3/2007 | Caradec et al. | |
| 2007/0200658 A1 | 8/2007 | Yang | |
| 2007/0204300 A1 | 8/2007 | Markley et al. | |
| 2007/0204314 A1 | 8/2007 | Hasek et al. | |
| 2007/0274340 A1 | 11/2007 | Raveendran et al. | |
| 2007/0288750 A1 | 12/2007 | Camenisch et al. | |
| 2007/0296613 A1 | 12/2007 | Hussain et al. | |
| 2008/0027953 A1 | 1/2008 | Morita et al. | |
| 2008/0049971 A1 | 2/2008 | Ramos et al. | |
| 2008/0052540 A1 | 2/2008 | Inokuchi et al. | |
| 2008/0066181 A1 | 3/2008 | Haveson et al. | |
| 2008/0181400 A1 | 7/2008 | Guleryuz et al. | |
| 2008/0209534 A1 | 8/2008 | Keronen et al. | |
| 2008/0243995 A1 | 10/2008 | Dong et al. | |
| 2008/0252490 A1 | 10/2008 | Chiluk et al. | |
| 2008/0294691 A1 | 11/2008 | Chang et al. | |
| 2008/0313340 A1 | 12/2008 | Liu et al. | |
| 2009/0016446 A1 | 1/2009 | Yang et al. | |
| 2009/0024925 A1 | 1/2009 | Stevens | |
| 2009/0047000 A1 | 2/2009 | Walikis et al. | |
| 2009/0086104 A1 | 4/2009 | Felder | |
| 2009/0110067 A1 | 4/2009 | Sekiguchi et al. | |
| 2009/0142038 A1 | 6/2009 | Nishikawa | |
| 2009/0154556 A1 | 6/2009 | Kim et al. | |
| 2009/0304115 A1 | 12/2009 | Pittaway et al. | |
| 2009/0310671 A1 | 12/2009 | Reynolds et al. | |
| 2009/0313300 A1 | 12/2009 | Dettori et al. | |
| 2010/0027974 A1 | 2/2010 | Ansari | |
| 2010/0046627 A1 | 2/2010 | Xiao et al. | |
| 2010/0195820 A1 | 8/2010 | Frank | |
| 2010/0205228 A1 | 8/2010 | Reese | |
| 2011/0016381 A1 | 1/2011 | Cahill et al. | |
| 2011/0061086 A1 | 3/2011 | Huang | |
| 2011/0116554 A1* | 5/2011 | Kwon | H04N 19/61 375/E7.026 |
| 2011/0131520 A1 | 6/2011 | Al-Shaykh et al. | |
| 2011/0185273 A1 | 7/2011 | DaCosta et al. | |
| 2011/0231481 A1 | 9/2011 | Calahan | |
| 2011/0276716 A1 | 11/2011 | Coulson et al. | |
| 2011/0306304 A1 | 12/2011 | Forutanpour et al. | |
| 2012/0069910 A1 | 3/2012 | Richardson et al. | |
| 2012/0069911 A1 | 3/2012 | Richardson et al. | |
| 2012/0072225 A1 | 3/2012 | Richardson et al. | |
| 2012/0250757 A1 | 10/2012 | Mabey et al. | |
| 2012/0317295 A1 | 12/2012 | Baird et al. | |
| 2012/0323758 A1 | 12/2012 | Henning | |
| 2013/0103786 A1 | 4/2013 | Miglore | |
| 2013/0188739 A1 | 7/2013 | Bystrom et al. | |
| 2013/0195171 A1 | 8/2013 | Wang et al. | |
| 2014/0126883 A1 | 5/2014 | Yogeshwar et al. | |
| 2014/0149586 A1 | 5/2014 | Clapp et al. | |
| 2014/0317668 A1 | 10/2014 | Zhang et al. | |
| 2014/0380113 A1 | 12/2014 | Luby et al. | |
| 2015/0006798 A1 | 1/2015 | Ural et al. | |
| 2015/0066642 A1 | 3/2015 | Gupta | |
| 2015/0128155 A1 | 5/2015 | Ji | |
| 2015/0195325 A1 | 7/2015 | Bystrom et al. | |
| 2015/0331870 A1 | 11/2015 | Bystrom et al. | |
| 2015/0334413 A1 | 11/2015 | Gorin et al. | |
| 2016/0277472 A1 | 9/2016 | Bystrom et al. | |
| 2017/0034127 A1 | 2/2017 | Singleton, IV et al. | |
| 2017/0163605 A1 | 6/2017 | Martin-Bale et al. | |
| 2017/0169123 A1 | 6/2017 | Reshadi et al. | |
| 2018/0027264 A1 | 1/2018 | Cheung et al. | |
| 2018/0343174 A1 | 11/2018 | Battre et al. | |
| 2020/0137436 A1 | 4/2020 | Dhanabalan | |
| 2021/0409818 A1 | 12/2021 | Bouazizi et al. | |

FOREIGN PATENT DOCUMENTS

| | | | |
|---|---|---|---|
| EP | 1912129 A3 | 4/2008 | |
| WO | 2005046058 A1 | 5/2005 | |
| WO | 2008127080 A1 | 10/2008 | |
| WO | 2015176009 A1 | 11/2015 | |

OTHER PUBLICATIONS

Avaro et al., "The MPEG-4 Systems and Description Language: A Way Ahead in Audio Visual Information Representation", Signal Processing: Image Communication (1997) 9(4): 385-431.

Bystrom et al., "A Fully Re-Configurable Universal Video Decoder", Conference on Design and Architectures for Signal & Image Processing (DASIP) 2009, 7 pages.

Chen et al., "Active Techniques for Real-Time Video Transmission and Playback", 2000 International Conference on Communications, New Orleans, LA Jun. 18-21, 2000, IEEE New York, NY; pp. 239-243.

Conor Hayes et al: "Smart Radio—Building Music Radio On the Fly" In: "Applications and Innovations in Intelligent Systems VIII", Jan. 1, 2001 (Jan. 1, 2001), Springer London, London, XP055576135, ISBN: 978-1-4471-0275-5, pp. 129-138, DOI: 10.1007/978-1-4471-0275-5_10,.

Deng, Xi, et al. "Combinatorial Testing of Browsers' Support for Multimedia", IEEE Transactions on Reliability, IEEE Service Center, Piscataway, NJ, US, vol. 69, No. 4, Dec. 1, 2020, (Dec. 1, 2020), pp. 1323-1340.

Ding et al., "Reconfigurable video coding framework and decoder reconfiguration instantiation of AVS", Signal Processing, Image Communication (2009) 24(4): 287-299.

(56) References Cited

OTHER PUBLICATIONS

European Telecommunications Standards Institute, Technical Specifications: Hybrid Broadcast Broadband TV, ETSI TS 102 796 (2012); 88 pages.
Gorin et al., "Just-In-Time Adaptive Decoder Engine: A Universal Video Decoder based on MPEG RVC", Proc 19th ACM Int'l Conference on Multimedia, New York; NY—USA (2011), 4 pages.
Gorin et al., "Optimized dynamic compilation of dataflow representations for multimedia applications", Annal Telecommun, Springer Verlag (2013) 68(3-4):133-151.
International Preliminary Report on Patentability mailed on Oct. 10, 2024 in PCT/US2023/016469.
International Search Report and Written Opinion mailed Jul. 14, 2023 in PCT/US2023/016469.
ISO/IEC 14496-12 Information Technology—Coding of Audio-Visual Objects—Part 12 ISO base media file format; International Organization for Standardization—4th Edition (2012); 196 pages.
ISO/IEC 14496-14 Information technology-Coding of audio-visual objects—Part 14 MP4 file format; International Organization for Standardization—1st Edition (2003); 18 pages.
Jang et al., "Reshaping Digital Media Business Models by Reconfigurable Video Coding", 78. MPEG Meeting; Oct. 23-27, 2006; Hangzhou, CN; (Motion Picture Expert Group or ISA/IEC JTC1/SC29/WG11); No. M13907, 5 pages.
Kannangara et al., "A Syntax for Defining, Communicating, and Implementing Video Decoder Function and Structure" IEEE Transactions on Circuits & Systems for Video Tech. (2010) 20(9):1176-1186.
Kawanaka et al: "Accessibility commons: A Metadata Infrastructure for Web Accessibility", Computers and Accessibility, Jan. 1, 2008, p. 153, XP055568322, 2 Penn Plaza, Suite 701 New York NY 10121-0701 USA. DOI 10.1145/1414471.1414500. ISBN: 978-1-59593-976-0. Chapter 4; p. 158.
OneCodec. "OneCodec: Future proof your media." (online) Sep. 23, 2011 1-10, 13-15 (23.09.2011) Available at http://vimeo.com/29476212. Retrieved on Mar. 14, 2013, 2 pages.
Philp et al., "Decoder Description Syntax for Fully Configurable Video Coding", ICIP, Nov. 2009, pp. 769-772.
Richardson et al., "A Framework for Fully Configurable Video Coding", Picture Coding Symposium 2009, 4 pages.
Richardson et al., "Dynamic transform replacement in an H.264 Codec", 15th IEEE International Conference on Image Processing (2008) pp. 2108-2111.
Richardson et al., "Fully Configurable Video Coding—Part 1: Overview of FCVC", ISO/IEC JTCI/SC20/WG11 document M16751, Jun. 2009, 6 pages.
Richardson et al., "Fully Configurable Video Coding Part 2: A Proposed Platform for Reconfigurable Video Coding", ISO/IEC JTCI/SC20/EG11 document M16752, Jun. 2009, (London, UK) 5 pages.
Richardson et al., "Implementing Fully Configurable Video Coding", 16th IEEE International Conference on Image Processing (ICIP) Nov. 2009, pp. 765-768.
Swaney, Daniel S. et al. "Dynamic Web File Format Transformations with Grace." ArXiv abs/cs/0512068 (2005): n. pag.
Zhao et al., "A Random Access Protocol for Configurable Video Coding", 90th MPEG Meeting; Oct. 26-30, 2009; Xian, CN; (Motion Picture Expert Group or ISO/IEC JTC1/SC29/WG11), No. M16927; 15 pages.

\* cited by examiner

MODULAR PIPELINES FOR ACCESSING DIGITAL DATA

CROSS REFERENCE TO RELATED APPLICATIONS

This application claims priority to U.S. Provisional Application 63/324,589 filed Mar. 28, 2022 and U.S. Provisional Application 63/326,252 filed Mar. 31, 2022. Both of these applications are hereby incorporated by reference in their entireties.

BACKGROUND

The present technology relates to systems and methods for accessing and/or decoding encoded digital data. More particularly, the technology relates to computer architecture and operating methods that can generate an accessor pipeline for accessing encoded digital data via selection and testing of one or more platform-independent functional units.

Digital data capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, data servers, and the like. Digital devices implement image and video encoding techniques or formats such as JPEG, GIF, RAW, TIFF, PBM, MPEG-2, MPEG-4, and H.264/MPEG-4, Part 10, Advanced Video Coding (AVC), to store, transmit and receive digital images and video efficiently. Digital devices implement audio encoding techniques or formats such as, AAC, MP3, and WAV to store, transmit, and receive digital audio efficiently. Digital devices implement additional data and graphics encoding techniques or formats such as IGES, 3DT, PS, MNG, ODF, HDFS, NetCDF, and SVG. Digital devices implement document, spreadsheet, and presentation formats such as PowerPoint, PDF, Microsoft Word, Microsoft Excel, and the like. Digital devices further implement proprietary data storage formats for storage of scientific or other data.

Digital data are commonly encoded prior to transmission or storage by an encoder, e.g., a server. The encoding typically consists of operations such as compression or organization into a selected format. The digital data may be independently stored or provided to a user. Alternatively, the digital data may be embedded in other digital data. For instance, an image, video, data, or animation may be part of an electronic news article, electronic slideshow, or technical paper. In either case, the digital data must be accessed, that is, decoded or interpreted prior to display or play by accessors resident on devices such as mobile devices, DVD players, Blu-Ray players, TV sets, tablets, laptops, computers, or set top boxes. However, a particular accessor may not support decoding or interpreting of the format used by the encoder. For example, the format used by the encoder may be a legacy format no longer supported or may be a new format that the accessor does not yet support. This presents challenges to the content generator, content provider, or archivist who wishes to ensure that the digital data are always accessible.

Since different access techniques may support different formats, the traditional solutions are to either: encode the digital data in many different formats to support many different decoders/interpreters; or to select a single format in which to encode a particular type of data. As examples of the latter approach, all images may be converted to a GIF format, or all text documents may be converted to rich text format or pdf format. In both cases, decoding and re-encoding of digital data can lead to loss in quality and content. Furthermore, the former case requires additional storage for the copies of the data in the various formats, while the latter case relies on a single accessor, that is, player or interpreter, always being supported on all platforms.

The MPEG Reconfigurable Video Coding (RVC) standard uses functional units as component blocks for abstraction in defining this technology standard, for example, as described at https://mpeg.chiariglione.org/standards/mpeg-b/codec-configuration-representation. Advantages of the RVC standard's use of functional units as component blocks include its ability support multiple platforms and flexibility in that a unit for one hardware and/or software platform can be replaced by a unit suited for another hardware and/or software platform. Units can be re-used among different decoders that use the same decoding algorithms. As new technology is created, new units may be developed and they can be added to the provided set of decoding tools to increase performance. However, RVC also has several disadvantages. Decoders must be constructed manually or must rely on a fixed set and arrangement of functional units as specified by a particular decoding standard.

Other multimedia encoders and decoders or frameworks decoders, such as GPAC (for example as described at https://www.mankier.com/package/gpac) or gstreamer (for example as described at http://www.gstreamer.freedesktop.org) have similarities to the RVC standard with decoder pipeline generation utilizing selectable components. Like RVC, advantages of GPAC and gstreamer include support for multiple platforms and flexibility in that a unit for one hardware and/or software platform can be replaced by a unit suited for another hardware and/or software platform. Units can be re-used among different decoders. As new technology is created, new units can be developed and added to the provided set of decoding tools.

However, like RVC, GPAC and gstreamer also have several disadvantages in that pipeline options are limited to a fixed pipeline constructed automatically for a specific platform, or a decoder/framework constructed manually by a user or relies on a fixed set and arrangement of functional units as specified by the framework standard or user application. The functional units are fixed for specific platforms, e.g., Windows. See, e.g., https://gpac.wp.imt.fr/downloads/. Accordingly, the functional units are further fixed in functionality and cannot be modified by any user interaction.

"Fully Configurable Video Coding" is another approach to video codec implementation that builds on the strengths of MPEG RVC and adaptive video coding techniques. In these systems, common platform-independent decoding engine can be configured to decode a wide variety of video sequences or syntax. An encoder sends a set of configuration commands which define a video decoding process in terms of a set of primitive operations and interconnections. The decoding engine receives these configuration commands and creates corresponding decoding objects to implement the required decoding functions. Video is then decoded by stepping through these decoding objects. This approach is more fully described in Bystrom, et al, A Fully Re-Configurable Universal Video Decoder, presented at the Design and Architectures for Signal and Imaging Processing Conference in 2009, which is hereby incorporated by reference in its entirety. Additional work in this area was discussed in Richardson, et al, A Framework for Fully Configurable Video Coding, presented at the Picture Coding Symposium in 2009, which is also hereby incorporated by reference in its entirety.

SUMMARY

The systems, methods, and devices described herein each may have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description" one will understand how the features of this technology provide advantages that include, without being limited thereto, enabling decoders to decode unsupported data formats.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
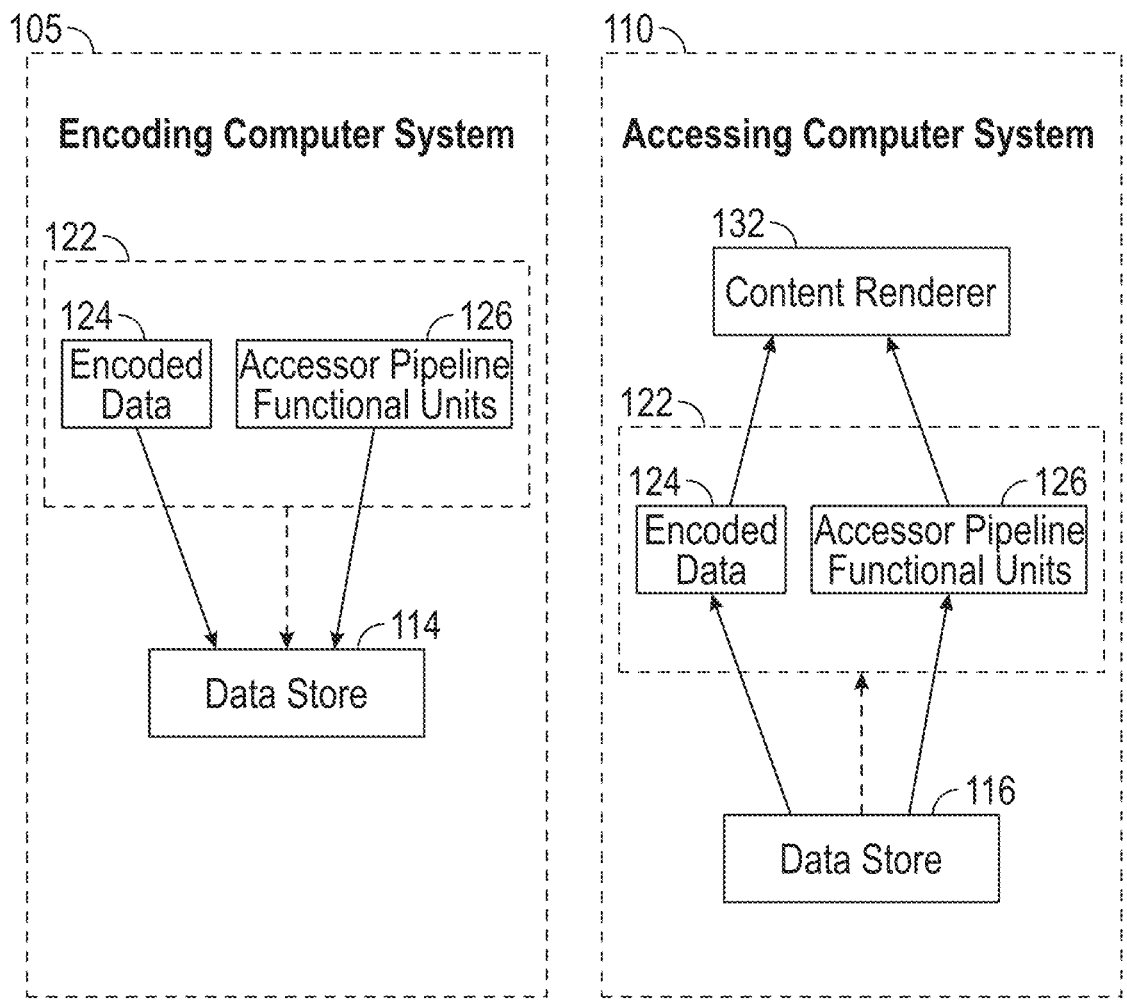
FIG. 1 is a block diagram of a system for decoding encoded digital data, in accordance with some example embodiments.

The following detailed description is directed to certain specific embodiments. However, the teachings herein can be applied in a multitude of different ways, including for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, a system or apparatus may be implemented or a method may be practiced using any number of the aspects set forth herein. In addition, such a system or apparatus may be implemented or such a method may be practiced using other structure, functionality, or structure and functionality in addition to or other than one or more of the aspects set forth herein. In this description, reference is made to the drawings wherein like parts are designated with like numerals throughout.

Definitions

Accessor: Software that can make encoded digital data available for display, interaction, processing, output, or any other desired functional use on an electronic device receiving and/or storing the data. Generally, a particular implementation of an accessor is configured to decode data that is encoded according to a particular defined compression algorithm/organizational format, or a family of compression algorithms/organizational formats. An accessor may also be referred to as a "decoder" herein. In some cases, in addition to basic decoding functionality such as decompression, an accessor may also function to extract one or more encoded data files from a container for decoding. An accessor as set forth herein can also include, in addition to one or more extraction and/or decoding functions, data manipulation or processing functionality that can be applied to digital data decoded by the accessor, for example, an accessor may incorporate word processing, image manipulation, or other functionality allowing a user to modify file content accessed by the accessor such as is normally provided by programs such as Word, Paint, PowerPoint, and the like.

File: Digital information that is or is intended to be associated with a single identifier such as a pathname in a computer operating system or a URL on the Internet. The identifier is typically used to support data processing and manipulation functionality such as get, save, open, copy, move, run, and the like to the set of digital data as a whole. A file can incorporate bits of any functionality or no functionality including computer programs, overhead, padding, and/or information or data in any form that is or is intended to be executed, interpreted, processed, stored, or manipulated by a computer system.

Container: Digital information organized in accordance with a metafile format defining how one or more files and optional metadata associated with the one or more files are organized together as the container. A container will typically (but not necessarily) itself be a file as defined above. Containers can be nested, wherein at least a first container is packaged as a file in a second container. Containers may include encoded data to be decoded and one or more accessors configured to decode encoded data, in some cases for subsequent rendering, processing, presentation, or other manipulation by one or more processing, output or display device(s).

Browser and Web Page: A browser is a computer program that provides functionality to a computer for interpreting and/or executing syntax contained in web pages. The computer may be connected to a computer network, and the network may be, and usually will be, the Internet. As used herein, browsers and web pages together provide functionality to a computer connected to a network (e.g. the Internet)

at least sufficient to request, retrieve, and render at least some network resources including web pages themselves, and to execute at least some links contained within or referred to in retrieved web pages to retrieve other web pages specified with the links. Web pages may include references such as uniform resource locators (URLs) and/or universal resource identifiers (URIs) to other network resources that contain images or other data that is retrieved by the browser from the network or from a cache memory when executing the web page, and may also include programs, libraries, style sheets, scripts, and the like which are executed in the browser environment when executing the web page. Executing some of these items may require prior separate loading of third-party software onto the computer for the browser to utilize, and some may be executable natively by the browser itself. As browsers become more sophisticated, they tend to incorporate more functionality natively that may have been introduced originally as third-party code. Any of these items that are accessed, used, and/or retrieved during browser execution of web page syntax are considered to be included as a component of the "web page" as that term is used herein. Examples of browsers include, but are not limited to, Internet Explorer and Edge distributed by Microsoft, Firefox distributed by Mozilla, and Chrome distributed by Google. Example web page syntax that can be executed by browser engines include the various versions of HyperText Markup Language (HTML) promulgated by the World Wide Web Consortium (W3C).

Browser Engines and Browser Extensions: Browser engines and browser extensions generally run together as the "browser" on a given computing device. There is no strict functional demarcation defining what part of a browser is engine, and what part is extension. As used herein, the term browser engine is used to refer to the software code of a browser that provides basic navigation and syntax execution for a browser as described in the definition of Browser and Web Page set forth above. Software code that provides functionality to a browser beyond that provided by such a browser engine may be referred to herein as a browser extension. Browser extensions may perform functions such as displaying and executing toolbar functions on top of retrieved web pages or blocking browser engine retrieval of advertisements that would otherwise be downloaded in conjunction with web page execution. A browser extension is typically executed within browser allocated memory space anytime the browser engine is running on a computing device. Accordingly, a browser extension may be periodically, intermittently, or continuously monitoring operations of the browser engine and, in some cases as will be described in more detail below, intercepting one or more communications from and/or to the browser engine. Browsers such as Internet Explorer and Chrome provide internal functionality allowing them to interact with browser extension software code distributed by third parties so long as the third-party code complies with the interface for browser extensions provided with the browser. However, as used herein, the terms browser engine and browser extension are not distinguished by how they are developed or distributed. Rather, the browser engine is that part of browser code that provides basic navigation and syntax execution capabilities like http format communication, html page interpretation, script and code execution such as Java and WebAssembly, whereas the browser extension is that part of browser code that provides additional functionality beyond those basic functions.

Browser Plug-In: A browser plug-in is a computer program invoked by the browser and run from browser allocated memory specifically in response to the browser engine reading code that invokes the plug-in. Accordingly, a browser engine may operate for extended periods of time without invoking and/or loading a plug-in and a plug-in never intercepts communications not addressed to the plug-in. Moreover, plug-ins must be explicitly loaded and/or enabled by a user of a browser engine in response to the browser engine reading code requiring functionality of the plug-in. For example, the Adobe Flash plug-in provides functionality to a browser engine for decoding and rendering Flash video files in response to the browser engine finding a Flash video MIME type in a web page. Plug-Ins are becoming deprecated technology as their functionality is increasingly incorporated into the native code of browsers themselves.

Server: Software executing on processing hardware coupled to a computer network having network resources accessible thereto that is configured at least in part to respond to client access requests to use or retrieve the network resources accessible to the server. Two or more different servers may be executing in parallel on a single hardware component such as a microprocessor or computer. A particular piece of computer hardware that is executing server software may also be referred to as a server.

Client: Software executing on processing hardware coupled to a computer network configured at least in part to issue requests to servers to use or retrieve network resources accessible to servers. Two or more different clients may be executing in parallel on a single hardware component such as a microprocessor or computer. Both clients and servers may be executing in parallel on a single hardware component such as a microprocessor or computer. A client executing on a processor may issue a request to a server executing on the same processor, which may respond to that client request. A particular piece of computer hardware that is executing client software may also be referred to as a client. A particular piece of computer hardware may be a client and a server at the same time.

Internet: The globally interconnected system of computers and computer networks that evolved from ARPANET and NSFNET over the late 1980s and early 1990s that may utilize TCP/IP network communication protocols.

Network Resource Identifier: A definition of a network resource (e.g. by storage location and filename) that is used by client computers to specify a network resource in access requests issued to the network by the client computers. A network resource identifier may also be referred to as a location of a network resource such as an image or a web page. Currently, when the network is the Internet, Network resource identifiers are known as URLs that are formatted in accordance with RFC 3986 of the Internet Engineering Task Force (IETF). For the purposes of this disclosure, any format for specifying a network resource in client access requests issued to a network is within the definition of the term Network Resource Identifier. A network resource identifier, including URLs as currently defined on the Internet, may further include data in addition to data identifying the network resource that a server hosting the network resource associated with the network resource identifier may use for other purposes beyond identifying the requested network resource.

Web Site: A collection of network resources including at least some web pages that share a common network resource identifier portion, such as a set of web pages with URLs sharing a common domain name but different pathnames.

Web Server: A server that includes functionality for responding to requests issued by browsers to a network, including, for example, requests to receive network resources such as web pages. Currently, browsers and web servers format their requests and responses thereto in accordance with the HyperText Transfer Protocol (HTTP) promulgated by the IETF and W3C. In some embodiments, a web server may also be a content server.

World Wide Web: The collection of web pages stored by and accessible to computers running browsers connected to the Internet that include references to each other with links.

Link: Syntax that instructs a browser executing the syntax to access a resource such as a network resource that is defined directly or indirectly by the syntax. The link syntax and/or internal browser engine functionality may also define conditions under which the access request is made by the browser engine, for example through cursor position and/or other interaction with an I/O device such as a keyboard or mouse. Some link syntax may cause the browser engine to access the specified network resource automatically while processing the syntax without user prompt or interaction. Links include HTML hyperlinks. A link may be directly coded with, for example, HTML tags and an explicit URL, or may be in the form of a script or other called function defined in a browser, in a browser extension, and/or in a webpage.

Network Resource: A web page, file, document, program, service, or other form of data or instructions which is stored on a network node and which is accessible for retrieval and/or other use by other network nodes.

Navigate: Controlling a browser to use a series of links to access a series of network resources.

Platform-independent: Software is platform-independent if it is not written specifically for execution by a particular operating/file system and/or a particular physical processing architecture. Platform-independent software generally executes inside another piece of software such as a browser or virtual machine that is not itself platform independent. Examples of platform-independent languages include but are not limited to Java and WebAssembly and, accordingly, platform-independent algorithms as described herein may comprise algorithms written in such platform-independent languages.

WebAssembly: A platform-independent programming language developed by W3C which can be executed within some browsers. It is similar to Java in that browsers can interpret WebAssembly code for execution on the underlying OS and hardware but WebAssembly is considered more efficient in its utilization of those underlying resources. Modules of WebAssembly code can run inside JavaScript. WebAssembly modules can be written in a human readable text format and compiled into WebAssembly syntax that is executable by browser software. Tools are also available that can compile programs written in other programming languages such as C into WebAssembly syntax files executable in browsers.

Various embodiments of systems and methods are described herein for accessing encoded digital data. In the embodiments described herein, the systems and methods may allow digital data to be accessed in a more efficient manner. For example, the systems and methods described herein may allow for selection and connection of platform-independent functional units from a library of platform-independent functional units, with the selected and connected functional units forming an accessor pipeline. Such approach(es) improve upon MPEG RVC and fixed-framework approaches, and may provide for an automated method of constructing an accessor for encoded digital data.

System Overview

FIG. 1 is a block diagram of data processing systems in accordance with some implementations of the principles set forth in this disclosure. The overview shows an encoding computer system 105, an accessing computer system 110, a data store 114 and a data store 116. Encoding computer system 105 and decoding computer system 110 may be any type or combination of digital data processing device(s) with and may be the same or different types or combination of types. Data stores 114 and 116 may be any type of data storage, e.g. magnetic, optical, solid-state, etc. and may reside in or otherwise be associated with any type of digital data processing device, for example, a server, special-purpose data archive or any other type of electronic hardware, and may reside in, be associated with, or be distributed between hardware components of either or both of the encoding computer system 105 and the accessing computer system 110. The data stores or portions thereof may be local or remote from each other, they may both be the same data store. In some implementations, portions of each data store will be locally available to the encoding computer system 105 and/or accessing computer system 110 and portions will be available remotely such as over a wide-area network such as the Internet. Different portions of and/or different ones of the one or more files 124 and 126 may be stored in different portions of the data stores 114 and 116. For example, the files 124 may be stored in one physical data store and the files 126 may be stored in a different physical data store.

Encoding computer system 105 is configured to generate or otherwise provide one or more files 124 comprising encoded digital data. The digital data of the one or more files 124 may be encoded in a particular data format (e.g. may be encoded/compressed into a particular proprietary or non-proprietary file format such as a Word document, PDF, JPEG, MPEG video, or the like). Different ones of the one or more files 124 may be encoded differently. The encoding computer system 105 may have received, retrieved, or otherwise obtained the one or more files 124 or the data in the file 124 in an encoded/formatted state or the encoding computer system 105 may apply an encoding/formatting algorithm to received, retrieved, or otherwise obtained data to generate the one or more files 124 of encoded data. The encoding computer system 105 is also configured to generate one or more files 126 comprising one or more accessor functional units or accessor functional unit descriptors. In some embodiments, the files 126 comprise platform-independent syntax (e.g. WebAssembly code) providing data accessing functionality or alternatively descriptors of data accessing functionality allowing retrieval of cached or separately stored modules of platform-independent syntax providing the data accessing functionality defined, pointed to, or otherwise indicated by the descriptors. The provided data accessing functionality may be applicable to accessing the encoded data in the one or more files 124. In some embodiments, the encoding computer 105 packages both the one or more files 124 comprising encoded data and the one or more files 126 comprising accessor functional units or accessor functional unit descriptors in a common container 122. In some embodiments disclosed below, either one or both of encoding computer system 105 and/or decoding computer system 110 is/are individually or collectively configured to implement a protocol for selecting one or more accessor functional units or accessor functional unit descriptors, and for assembling accessor functional units based on the selection(s) into an accessor pipeline configured to access encoded data in the one or more files 124. The data in the one or more files 124 can then be rendered on or with the accessing computer system 110 with a content renderer 132.

Encoding computer system 105 and/or accessing computer system 110, may each comprise one or more hardware components (e.g., registers, buffers, processors, memories and/or other circuitry) and/or non-transitory, computer-readable instructions or code that, when executed by such processor(s), memory and/or other circuitry of encoding computer system 105 and/or accessing computer system 110, cause encoding computer system 105 and/or accessing computer system 110 to select, assemble, implement and/or test platform independent algorithm(s) for accessing encoded content in the one or more files 124. It will be appreciated that hardware and software components of the encoding computer system 105 and the accessing computer system 110 may overlap in whole or in part.

Figure 3A:
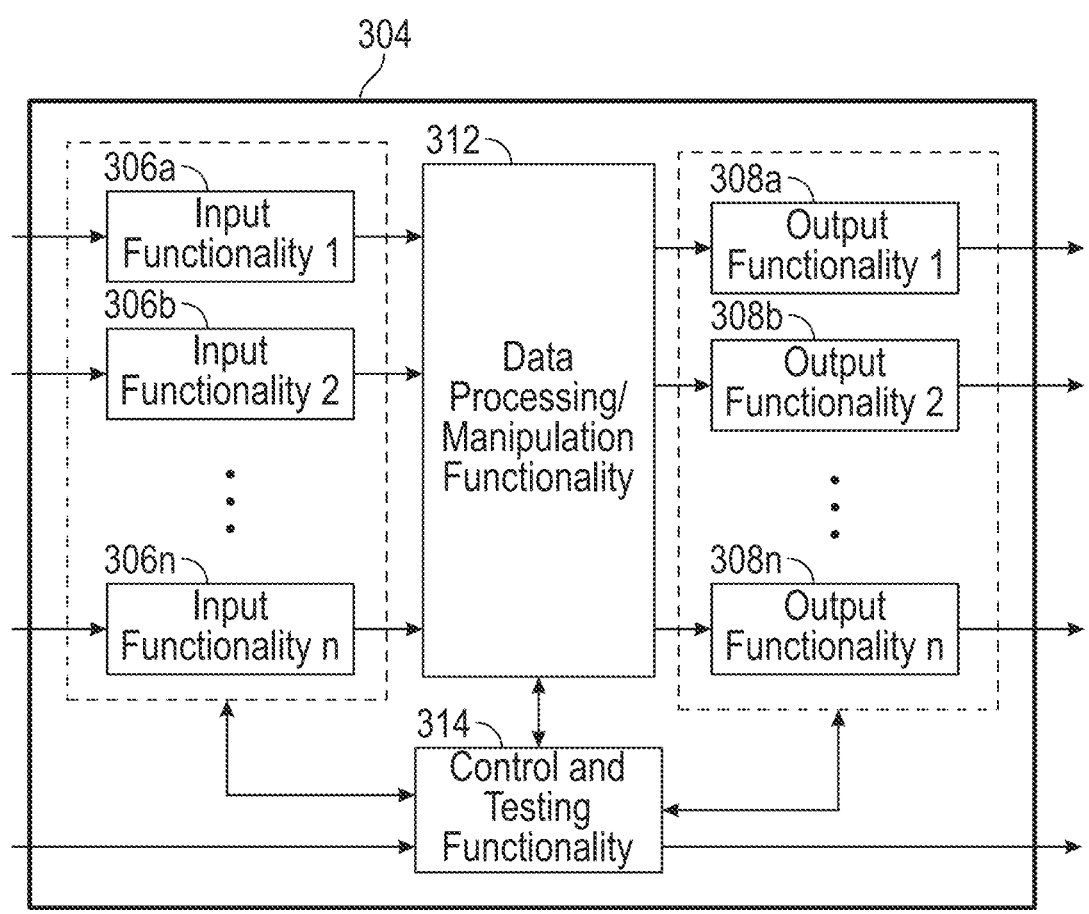
FIG. 3A is a block diagram illustrating a generic accessor pipeline functional unit, in accordance with some example embodiments.
Figure 3B:
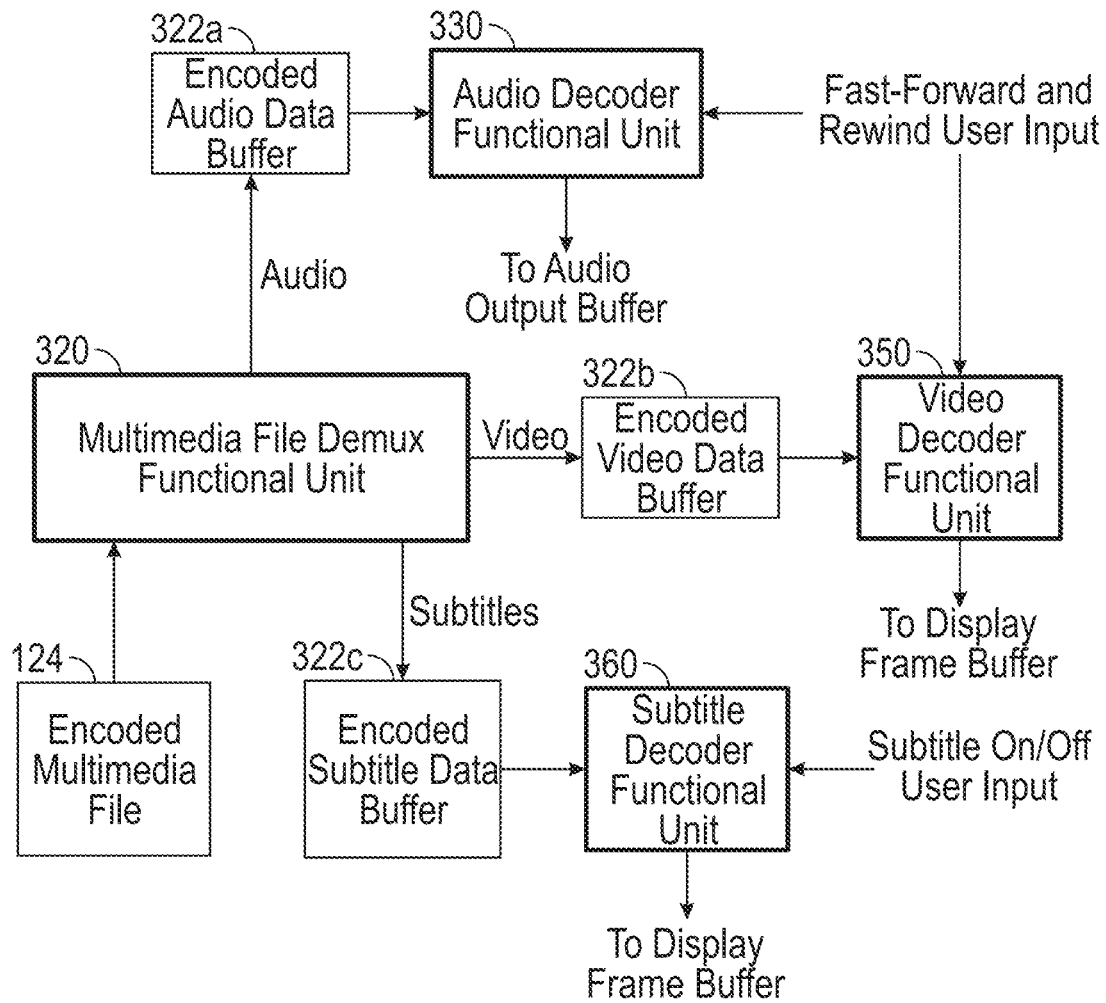
FIG. 3B is a block diagram of an accessor pipeline formed from a series of connected accessor pipeline functional units, in accordance with some example embodiments.
Figure 3C:
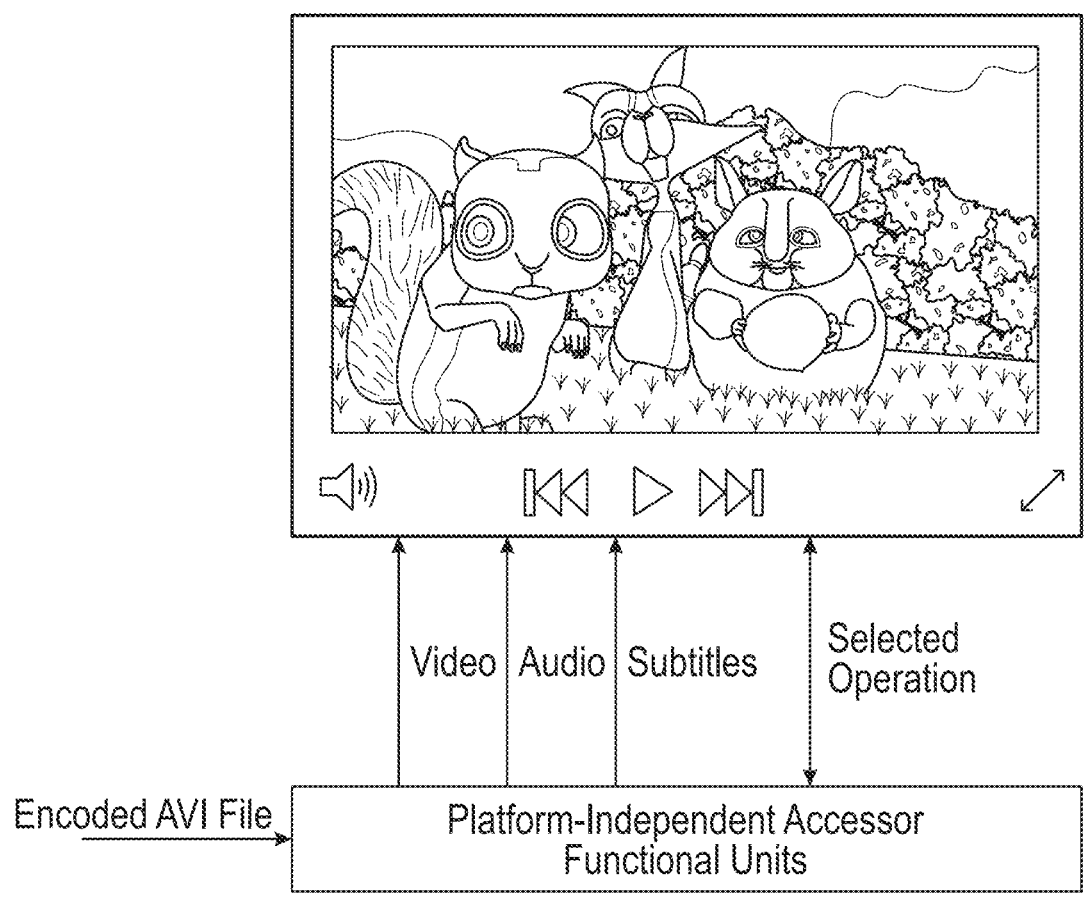
FIG. 3C illustrates rendering a multimedia file in accordance with principles described herein.
Figure 3D:
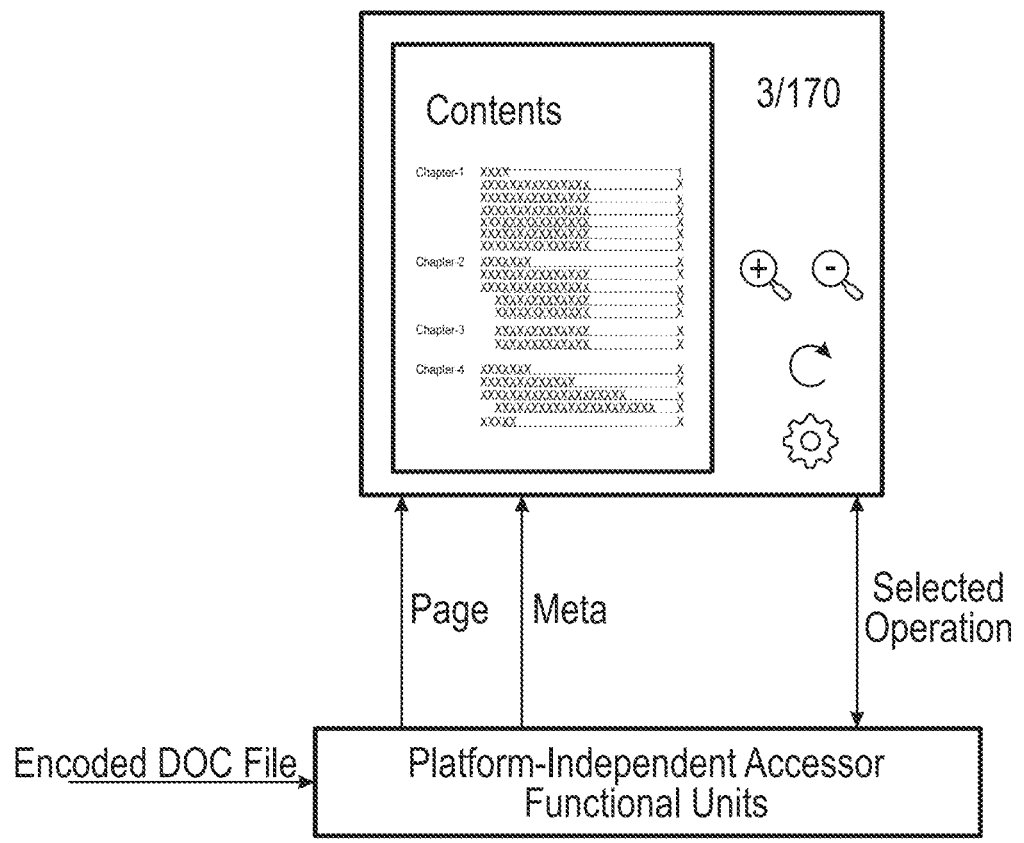
FIG. 3D illustrates rendering a text file in accordance with principles described herein.
Figure 4A:
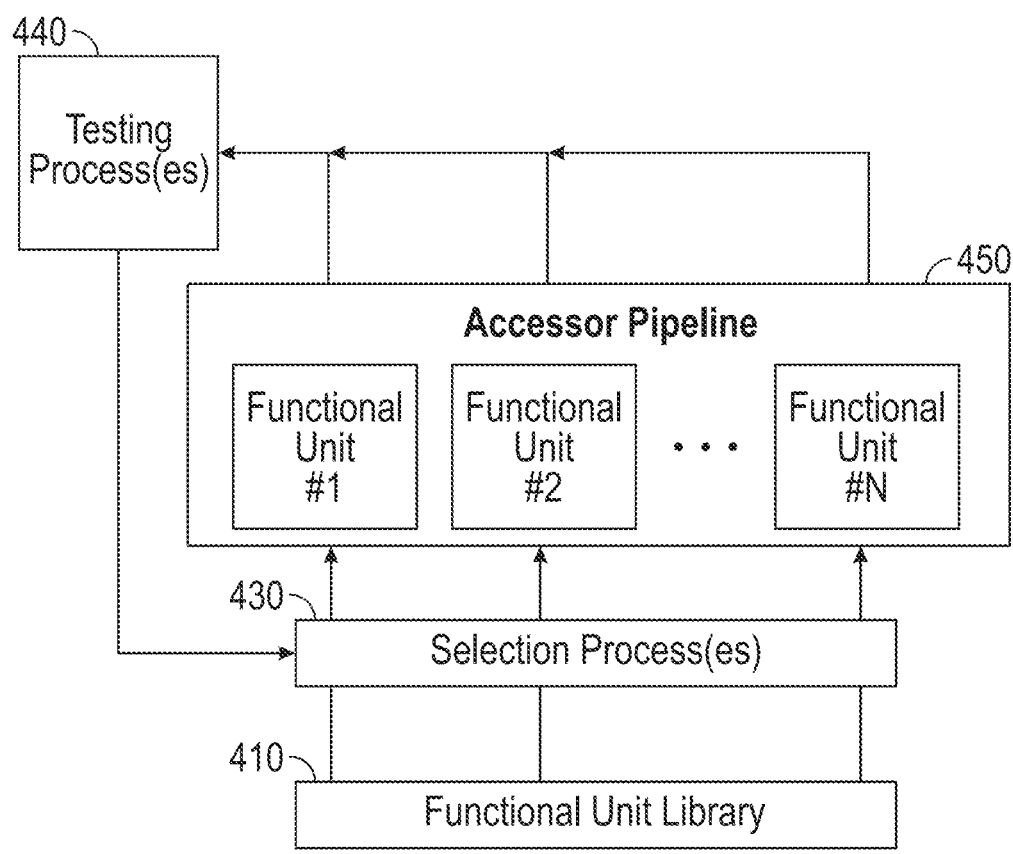
FIG. 4A is a block diagram illustrating an accessor pipeline generation process comprising connecting one or more functional units selected from a functional unit library and guided by a knowledge base, in accordance with some example embodiments.
Figure 4B:
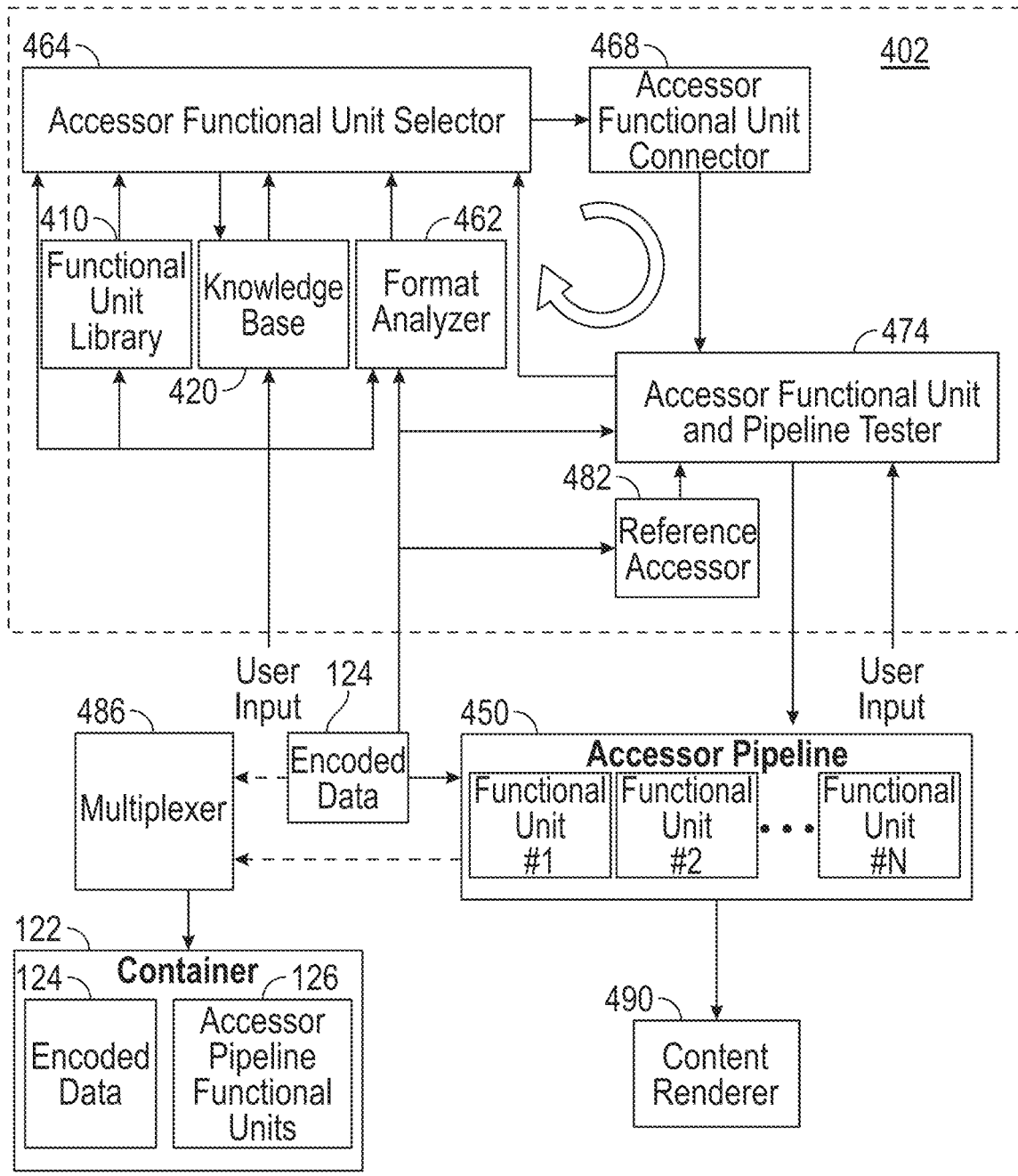
FIG. 4B is a block diagram illustrating an accessor pipeline generator.

For example, if file 124 is an encoded audio/video file (such as shown in FIGS. 3B and 3C), an accessor pipeline 450 (see, for example, FIGS. 4A and 4B) may comprise one or more accessor functional units 126 (e.g., shown as Functional Unit(s) #1, #2 . . . #N in FIGS. 4A and 4B) assembled into an accessor configured to play the audio/video file. If file 124 is an encoded text file such as a Word or WordPerfect document file (such as shown in FIG. 3D), an accessor pipeline 450 may comprise one or more functional units assembled into an accessor comprising at least a basic word processing program that can read and interpret the document file and, in some embodiments, prepare it for display or presentation to a user, and, in some embodiments, allow text editing and other manipulation of the document. In some embodiments described below, one or both of encoding computer system 105 and decoding computer system 110 is individually configured to assemble and/or test functionality of accessor pipeline(s) 450 comprising such selected accessor functional units 126 (e.g., demultiplexers, decoders, etc.).

In some implementations, one or more files of encoded data 124 and one or more files of accessor pipeline functional units 126 generated by encoding computer system 105 are received, retrieved, or otherwise obtained by accessing computer system 110, which may then access the data in the one or more files 124 using the one or more files 126 that comprise accessor functional units or functional unit descriptors. In some embodiments, a container 122 generated by encoding computer system 105 includes both the files 124 and the files 126. It will be appreciated that in some cases encoding computer system 105 and accessing computer system 110 may be the same computer system. In some embodiments, an amount of time between the generation of the accessor pipeline functional units in the one or more files 126 and the use of those files 126 to access the data in the one or more files 124 is a time period that traditionally presents challenges in preserving and/or maintaining an ability to access archived data. For example, and not limitation, time period may be 50 or 100 years. Encoding computer system 105 and/or accessing computer system 110 may be individually or together configured implement a protocol for the selection of one or more platform-independent accessor pipeline functional units in the one or more files 126, and for assembling the selected functional units into an accessor pipeline that is configured to decode encoded data in the one or more files 124.

Figure 2:
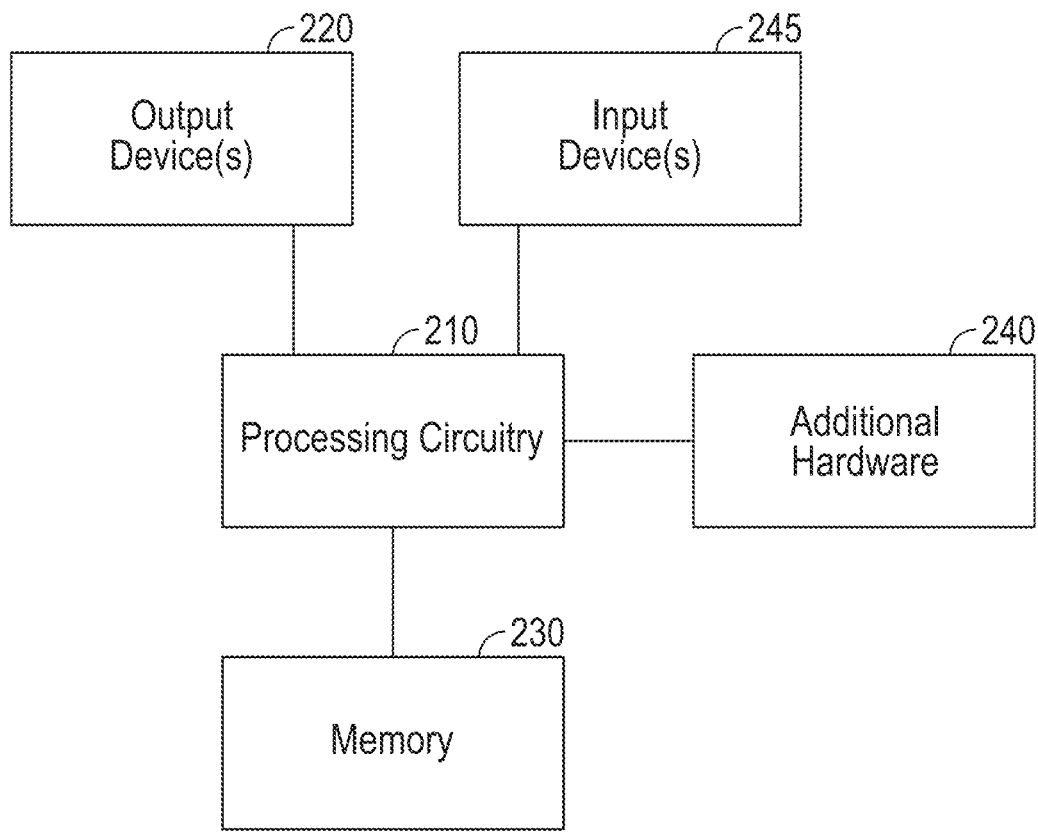
FIG. 2 is a block diagram of exemplary components of encoding computer system and/or decoding computer system of FIG. 1, in accordance with some example embodiments.

FIG. 2 is a block diagram illustrating several example components of encoding computer system 105 and/or accessing computer system 110 of FIG. 1, in accordance with some embodiments. Encoding and/or accessing computer systems 105, 110 may comprise processing circuitry 210, one or more memories 230 and additional hardware 240 configured to provide function and/or support for the carrying out of any procedure, process, action and/or step as described in this disclosure.

In some embodiments, memories 230 comprise non-transitory, computer-readable instructions that, when executed by, e.g., processing circuitry 210 and/or additional hardware 240, cause at least one component of encoding and/or accessing computer systems 105, 110 to carry out of any procedure, process, action and/or step as described in this disclosure.

In some embodiments, encoding and/or accessing computer systems 105, 110 comprises one or more output device(s) 220 configured to display and/or present at least some information or content to a user as described anywhere herein. For example, output device(s) 220 may comprise one or more of a display screen, a touch screen, audio speakers, a vibrating or other haptic feedback device, or any other suitable output device. In some such embodiments, output device(s) 220 may be configured to present to a user information pertaining to a request for user input, the user input, a state of encoding and/or accessing computer systems 105, 110 and/or of a process being, or having been, performed or otherwise carried out by encoding and/or accessing computer systems 105, 110 and/or at least a portion of data accessed from the one or more encoded data files 124.

In some embodiments, encoding and/or decoding computer systems 105, 110 comprises, or is otherwise configured to operably communicate with, one or more user input devices 245, for example, a keyboard, a computer mouse, a stylus, a microphone or any other suitable user input device. Encoding and/or decoding computer systems 105, 110 may be configured to receive user input via user input device(s) 245 and, in some embodiments, perform or otherwise carry out one or more processes based on the user input as described anywhere in this disclosure.

Accessor Functional Units and Pipelines

FIG. 3A is a block diagram of an exemplary generic accessor functional unit 304. As will described further below, accessor functional units 304 may provide a wide range of functionalities for application to encoded digital data. Such functionalities may include basic decoding and extraction processes such as decompression and demultiplexing files from containers as well as providing functionality for processing and user manipulation of the accessed data and providing additional user interface features for interacting with the accessed data. Each accessor functional unit may have a common general architecture with a set of specified inputs 306 and a set of specified outputs 308. Inputs 306 can be connected to the initial input data buffer/storage location or to a previous functional unit of an accessor pipeline, possibly through a shared input/output buffer. Inputs may also be connected to input devices such as keyboards and mice when, for example, the functional unit 304 has user-controlled data processing functionality 312. Outputs of functional units 304 may be connected to output devices such as displays, speakers or data storage devices or may be connected to output buffers for forwarding functional unit output data to a subsequent functional unit of the accessor pipeline (e.g. via an output buffer).

Each functional unit also comprises data processing functionality 312 for performing a function or subfunction of a data accessor such as decompression, demultiplexing, or other form of data processing or manipulation. Data processing functionality can also include the generation of user interface features for viewing and/or manipulating accessed data.

The functional units 304 may also include control and testing functionality 314. This functionality may at least in part define or configure the number and function of the inputs and outputs of the functional unit. This functionality may also be used to detect whether the data being accessed is being decompressed, extracted, output, manipulated, etc. in a desired manner by the data processing functionality 312. The control and testing functionality 314 may generate success or error output codes that can be used to guide an automated or semi-automated process of accessor pipeline generation as described in more detail below. These error codes may be passed to functional unit selection functionality, a subsequent functional unit in an accessor pipeline, or may be output to a user during the process of accessor pipeline generation. The control and testing functionality may receive user input regarding accessor pipeline or accessor functional unit performance or may receive error or success codes from preceding functional units in an accessor pipeline.

FIG. 3B is a block diagram of an example accessor pipeline comprising four accessor pipeline functional units. In this example, a file 124 is received by the accessor pipeline. In this example, the file 124 is an encoded multimedia file. This multimedia file 124 comprises a container of different files, in this example an encoded audio data file, an encoded video data file, and an encoded subtitle data file. Thus, as an initial functional unit for the accessor pipeline a demultiplexer functional unit 320 is selected. This accessor pipeline functional unit 320 has three outputs, one for encoded audio, one for encoded video, and one for encoded subtitles. These three outputs are routed to output buffers 322a, 322b, and 322c which are coupled respectively to an audio decoder functional unit 330, a video decoder functional unit 350, and a subtitle decoder functional unit 360.

Each functional unit 320, 330, 350, and 360 is advantageously platform-independent, for example written in WebAssembly, which enables long-term storage/preservation, efficient transcoding, new ways to interact with video (e.g., video editing within a browser), personalized video and/or data without requiring underlying browser plugins and enables servers to deploy standards-independent data streams. As illustrated in FIG. 3B and first described above with reference to FIG. 3A, accessor functional units 304 may accept user input for function control. In the example of FIG. 3B, a user input may be used to toggle the subtitle decoder functional unit 360 on and off such that no resources are used for subtitle decoding if the user does not wish to view the subtitles. Also in this embodiment, user inputs for fast forward and rewind functions may be used to control operation of the audio decoder and video decoder functional units 330 and 350. This aspect of these decoder functional units 335 and 350 allows efficient fast forward and rewind functionality to be deployed.

FIG. 3C illustrates a frontend user-interface of a multimedia player using an accessor pipeline assembled from accessor functional units 304, such as some or all of the accessor function units illustrated in FIG. 3B. Decoded audio and video and user playback control are provided by various functional units of the pipeline. FIG. 3D illustrates a frontend user-interface of a word processor using an accessor pipeline assembled from accessor functional units 304. Text and other document content as well as document manipulation capabilities are provided by various functional units of the pipeline.

Accessor Pipeline Generation

A conceptual illustration of accessor pipeline generation from accessor functional units in accordance with some implementations of the principles described herein is provided in FIG. 4A. In this figure, accessor pipeline 450, assembled and/or assembleable from one or more such functional units 304 is illustrated. In some embodiments, the multimedia accessor pipeline of FIG. 3B may be one example implementation or embodiment of accessor pipeline 450. In some embodiments, accessor pipeline 450 comprises one or more functional units #1, #2 . . . #N. As noted above with reference to FIGS. 3A and 3B, each functional unit may have a specified, but potentially dynamic, set of inputs and a specified but potentially dynamic, set of outputs. For example, as illustrated in FIG. 3B, demultiplexer functional unit 320 may have one input but a varying number of outputs, for example one or more encoded video, audio, or subtitle data streams ultimately fed to respective accessor functional units 330, 350, and 360.

As will be described in more detail in connection with FIG. 4B and process flowcharts illustrated in one or more of FIGS. 5-7, one or more selection processes 430 are used to select one or more functional unit(s) from a functional unit library 410. The selection processes 430 may be guided at least in part by a knowledge base 420 (FIG. 4B) and user input (FIG. 4B). In some example embodiments, selection processes 430 may be performed by accessor pipeline functional unit selector 464 of FIG. 4B. Upon selection, the one or more such functional units may be assembled into accessor pipeline 450 and subjected to a testing process 440 configured to test adequate and/or proper functionality of the one or more selected and assembled functional units 304. In some example embodiments, testing process 440 may be performed by accessor functional unit and pipeline tester block 474 of FIG. 4B. For example, each input of a given selected functional unit may be attached to an input or output of a previous selected functional unit in pipeline 450 or to an input digital data buffer. Each output of a given selected functional unit may be attached to a future selected functional unit in pipeline 450 or to an output sink, such as an output buffer or an output device.

Functional Unit Library 410 may be in local memory or hosted on a local or remote server and/or any other local or remote memory and/or storage device configured to archive and/or otherwise store thereon or therein a plurality of platform-independent functional units, which alone or in appropriate combinations, may be assembled into accessor pipeline 450.

FIG. 4B is a block diagram illustrating hardware and software functional components for an accessor pipeline generator 402 that may be configured with or as software modules that perform techniques as described in this disclosure. Accessor pipeline generator 402 may be implemented via electronic processing hardware, e.g., any one or more of processing circuitry 210, memory 230, and/or additional hardware 240 of encoding computer 105, which may comprise one or more general purpose processors, field programmable gate arrays, digital signal processors, or the like. For example, each of the blocks shown in FIG. 4B may comprise or otherwise represent, at least in part, non-transitory, computer-readable instructions that, when executed, configure such one or more electronic hardware processors (e.g., processing circuitry 210) to perform the functions described below. The illustrated blocks of FIG. 4B are presented for explanation of the functionality of the inventive systems described herein and do not indicate or imply that the specific functions associated with a block in this description is necessarily associated with a particular or individual module of software code or hardware component(s). The functions described with reference to FIG. 4B can be arranged in a wide variety of ways, may overlap, and may be combined in ways different than the specific blocks illustrated in FIG. 4B.

The fundamental components of the accessor pipeline generator of FIG. 4B are the functional unit library 410, the accessor functional unit selector 464, the accessor functional unit connector 468, and the accessor functional unit and pipeline tester 474. As illustrated in FIG. 4B, a repeating process of functional unit selecting, connecting, and testing can be performed where detected errors in accessing the data with the current set of functional units from the library cause the accessor functional unit selector 464 to remove a functional unit from the currently generated accessor pipeline and select a new functional unit from the functional unit library to add to the accessor pipeline. This process can be repeated until no errors are detected and the data can be successfully accessed by the assembled accessor pipeline. If this process is performed on accessing computer 110, then the accessor pipeline 450 that survived the selection and testing process can be used to receive the encoded data 124 and output the accessed data for viewing and/or manipulation by content renderer 490, which may, in a browser context for example, comprise a browser executable script configured to generate an appropriate UI window in the browser through which the user can interact with the accessed content. If this process is performed on encoding computer 105, then the accessor pipeline 450 that survived the selection and testing process can be stored for future use. In some implementations, the surviving accessor pipeline 450 can be stored with the encoded data file 124 in a common container 122 as described above.

The accessor functional unit and pipeline tester 474 may evaluate the output(s) of each separate functional unit selected by the accessor functional unit selector 464 as well as the output(s) of the completed current version of the accessor pipeline being generated. This evaluation my involve generating success and error codes such as described above for feeding back to the accessor functional unit selector 464. In some embodiments, one or more reference accessors 482 may be available to test functional unit and/or pipeline output. Reference accessor 482 may also be configured to receive encoded digital data 124. Reference accessor 482 accesses encoded data 124 and either outputs the accessed data or outputs a set of tests of selected features of the accessed encoded data 124. As an example, if encoded data 124 are audio with embedded lyrics, reference accessor may output a set of audio samples and/or ASCII text of embedded lyrics. As another example, if encoded data 124 are scientific data and includes the feature of displaying and rotating the data by 30 degrees, reference accessor 482 may output the data and an image of the rotated data.

The accessor functional unit and pipeline tester 474 may comprise a comparator that receives the output of reference accessor 482 and performs comparisons of the reference output and the output of the currently generated accessor pipeline. As an example, the comparison may be performed on a sample-point-by-sample-point basis or may be a subjective quality comparison.

In some embodiments, accessor functional unit and pipeline tester 474 may further receive input from a user. In some embodiments, the input may be in the form of one or more thresholds for acceptable performance or it may be in the form of direct indication of acceptable quality.

It is possible for the above-described repeated selection and testing to be performed exhaustively on the functional units in the functional unit library 410 until successful access is achieved. However, the process can be improved and made more efficient by providing one or more forms of guidance to the accessor functional unit selector 464 such that exhaustive selection and testing isn't necessary. In the implementation of FIG. 4B, this guidance may be provided by one or more of a format analyzer 462, a knowledge base 420, and/or direct user input.

Format analyzer 462 may be configured to receive encoded digital data 124. Format analyzer 462 may be configured to analyze encoded digital data file(s) 124 in order to acquire information regarding the format in which the digital data files 124 are encoded. For example, format analyzer 462 may compare the encoded data against structures stored in an information repository such as knowledge base 420. The format analyzer 462 may search for structures in the encoded data file 124 which may include, for example, file names, stream headers, formatting codes, magic numbers, MIME types, file extensions, etc. Based on the comparison to stored structures associated with known file formats and encoding algorithms, if one or more matching structures are found, format analyzer 462 may be able to determine the format of encoded data file 124 or portions of encoded data file 124.

Format analyzer 462 may further be configured to determine presence and formats of embedded features or components present in an encoded data file 124. As examples, an encoded video stream may contain closed captions while an encoded audio stream may contain embedded lyrics. As additional examples, a slide show may contain embedded video while scientific data may contain embedded annotations. One of ordinary skill in the art should recognize that format analyzer 462 may be configured to compare and/or analyze the data to determine a format in other manners as well. In some embodiments, format analyzer 462 further provides information about the detected format(s) or a signal indicating an unknown format to accessor functional unit selector 464.

Accessor functional unit selector 464 may have access to a datastore, for example knowledge base 420, which may include definitions of associations between one or more of the indicated formats and one or more accessor functional units 126. If a particular detected format is known, then accessor functional unit selector 464 may identify one or more functional units 304 associated with the detected format using the knowledge base 420. The selected functional units 304 may implement algorithms capable of accessing data in the detected format. For example, if one of the indicated formats is a .wav format, the accessor pipeline generator 402 may retrieve an association between .wav and one or more accessor pipeline functional units capable of decoding and/or playing a .wav file.

In some embodiments, accessor functional unit selector 464 may then select one or more particular functional units based on the identified functionalities that are capable of decoding the detected format. In some embodiments, accessor functional unit selector 464 has only one functional unit to select from the library that is appropriate for a particular format, and thus, no choice between multiple functional units in the functional unit library 410 may be required.

In some embodiments, accessor functional unit selector 464 is configured to receive input related to selection of a functional unit from knowledge database 420 and/or directly from a user during the accessor pipeline generation process. In some embodiments, this input may comprise information about encoded digital data 124, which may be used to influence selection of one or more functional units (e.g., Units #1, #2, #N in FIG. 4B) to be selected from the library 410. This information may include memory, processor and/ or power constraints of encoding and/or accessing device(s) 105, 110, an indication of one or more desired features the accessor should support (e.g., closed-captioning), an indication of one or more functional units to exclude (e.g., intellectual property rights the user does not have), and/or an indication of ordering for functional units in the library 410. In some embodiments, the set of functional units in the library 410 that the accessor functional unit selector 464 is permitted to select may be limited by such input from the user. In some embodiments, a set of permitted functional units may be further ordered and/or sorted based at least in part on such input from the user and/or based at least in part on other constraints, such as popularity, reliability, and/or efficiency of one or more functional units or combinations thereof. In some embodiments, accessor functional unit selector 464 may be configured to read configuration information from the knowledge base 420 that controls how accessors should be selected. For example, in some embodiments, a selection rule may be specified that indicates proprietary accessors should be selected over non-proprietary accessors when both types of accessors are available for a particular data type. The selection rule may then be executed by accessor functional unit selector 464.

In some embodiments, knowledge base 420 may function as a configuration file. In some embodiments, knowledge base 420 is generated at least in part by a user. In some embodiments, knowledge base 420 is generated or externally populated at least in part by a third-party, for example a company, entity or person, and may include suggestions for groupings and/or sets of functional units, their ordering, and potential best or desired uses with respect to one or more types of encoded data. In some embodiments, such suggested groupings or sets, or indications thereof, may be stored within knowledge base 420.

As one example, a baseline JPEG image may form at least a portion of encoded data 124, and accessor functional unit selector 464 may have available two functional units in functional unit library 410, each comprising a full image decoder implementation. The first functional unit may comprise a proprietary compact decoder that supports only baseline JPEG. The second functional unit may comprise a larger, slower, non-proprietary implementation that supports progressive decoding in addition to baseline decoding. Input from the knowledge base 420 may control the accessor functional unit selector 464 to select a particular one of the two based on rules in the knowledge base 420.

As another example, a PDF document may form at least a portion of encoded data 124, and accessor functional unit selector 464 may have available functional units from functional unit library supporting features such as commenting and highlighting in addition to basic viewing. Where the PDF document permits embedding of multiple image formats (e.g., JPEG, PNG, or BMP), the accessor pipeline generator 402 may examine the digital data and consider functional units for decoding one or more image formats based on image type(s) detected in the PDF document, or based on the result of a test of each image-decoding functional unit on images embedded in the PDF document.

Figure 5:
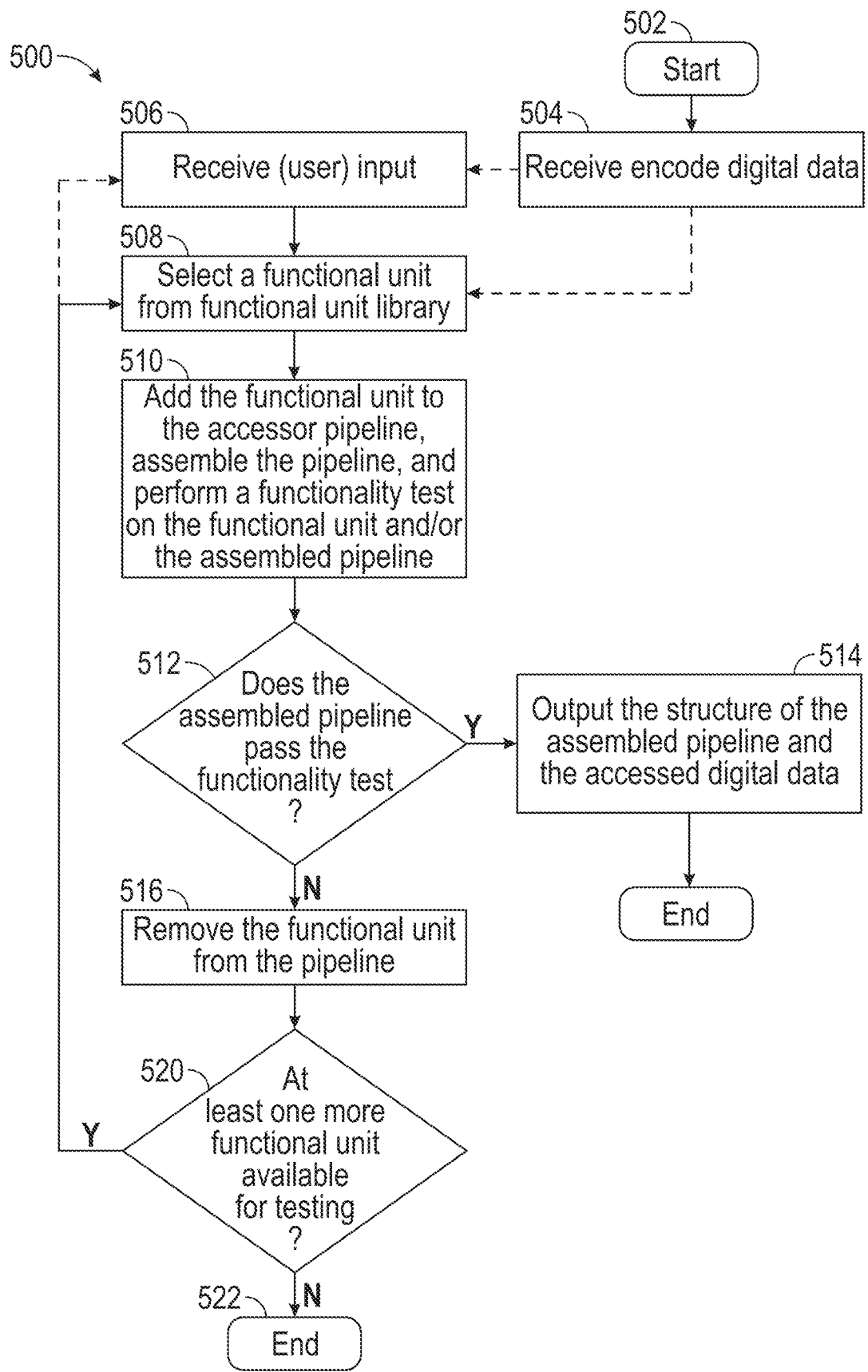
FIG. 5 is a flowchart illustrating a method for generating an accessor pipeline, in accordance with some example embodiments.

FIG. 5 is a flowchart 500 related to a method for generating an accessor pipeline, in accordance with some example embodiments. In some embodiments, one or more blocks of flowchart 500 may be performed by instructions included in or accessible by at least one entity of accessor pipeline generator in FIG. 4B, operating on, or utilizing, processing circuitry 210, memory 230, and/or additional hardware 240 of respective computer systems 105, 110 as shown in FIG. 2.

Flowchart 500 starts at start block 502 and advances to block 504, which includes receiving encoded digital data. For example, in some embodiments according to FIG. 4B, accessor functional unit selector 464 may be configured to receive files 124 comprising encoded digital data. From block 504, accessor functional unit selector, 464, accessor functional unit connector 468, and accessor functional unit and pipeline tester 474 perform a potentially repeating or iterative process (e.g., process(es) 440 of FIG. 4A) of selecting a functional unit from a functional unit library 410, assembling the selected functional unit into a candidate accessor pipeline, and testing the selected functional unit and/or the candidate pipeline for successful operation. In some cases, part of the repeated or iterative process includes receiving user input at block 506 which may provide input regarding the selection of functional units or the indications of performance acceptability for a candidate accessor pipeline.

Flowchart 500 advances from block 506 to block 508. In embodiments where the process does not receive user input, flowchart 500 may advance directly from block 504 to block 508. Block 508 includes selecting a functional unit from the functional unit library 410.

Flowchart 500 advances from block 508 to block 510, which includes adding the functional unit to the candidate pipeline, assembling the pipeline, and performing functionality testing of the selected functional unit and/or the assembled pipeline including the selected functional unit. For example, in the context of the Figures presented above, accessor functional unit selector 464 and accessor functional unit connector 468 may be configured to attach at least one process and buffer (e.g., a portion of memory 230 of encoding and/or accessing computer systems 105, 110) to a sequence of previously selected functional units (if any have been selected previously) and to attempt to access at least a portion of encoded data in files 124 utilizing the selected and linked functional unit(s).

Flowchart 500 advances from block 510 to block 512, where a determination is made as to whether the selected functional unit and/or assembled pipeline passes the functionality test. Such a determination may be made, at least in part, by accessor functional unit and pipeline tester 474.

If the currently assembled pipeline fails the functionality test, flowchart 500 advances from block 512 to block 516, which includes removing the functional unit that caused an error. Flowchart 500 then advances to block 520. If the currently assembled pipeline passes the functionality test, flowchart 500 advances to block 514, which includes outputting the structure of the assembled pipeline and the accessed digital data.

Flowchart 500 may then advance to block 520 if not terminated by successful pipeline generation at blocks 512 and 514. Block 520 includes determining whether at least one more functional unit is available or pending for testing. If not, flowchart 500 proceeds to end block 522. If at least one more functional unit is available or pending for testing, flowchart 500 proceeds back through another iteration of functional block selection and testing. In embodiments where input regarding selection of the next functional unit is received, flowchart 500 proceeds from block 520 back to block 506. In embodiments where input regarding selection of the next functional unit is not received, flowchart proceeds from block 520 back to block 508.

Figure 6:
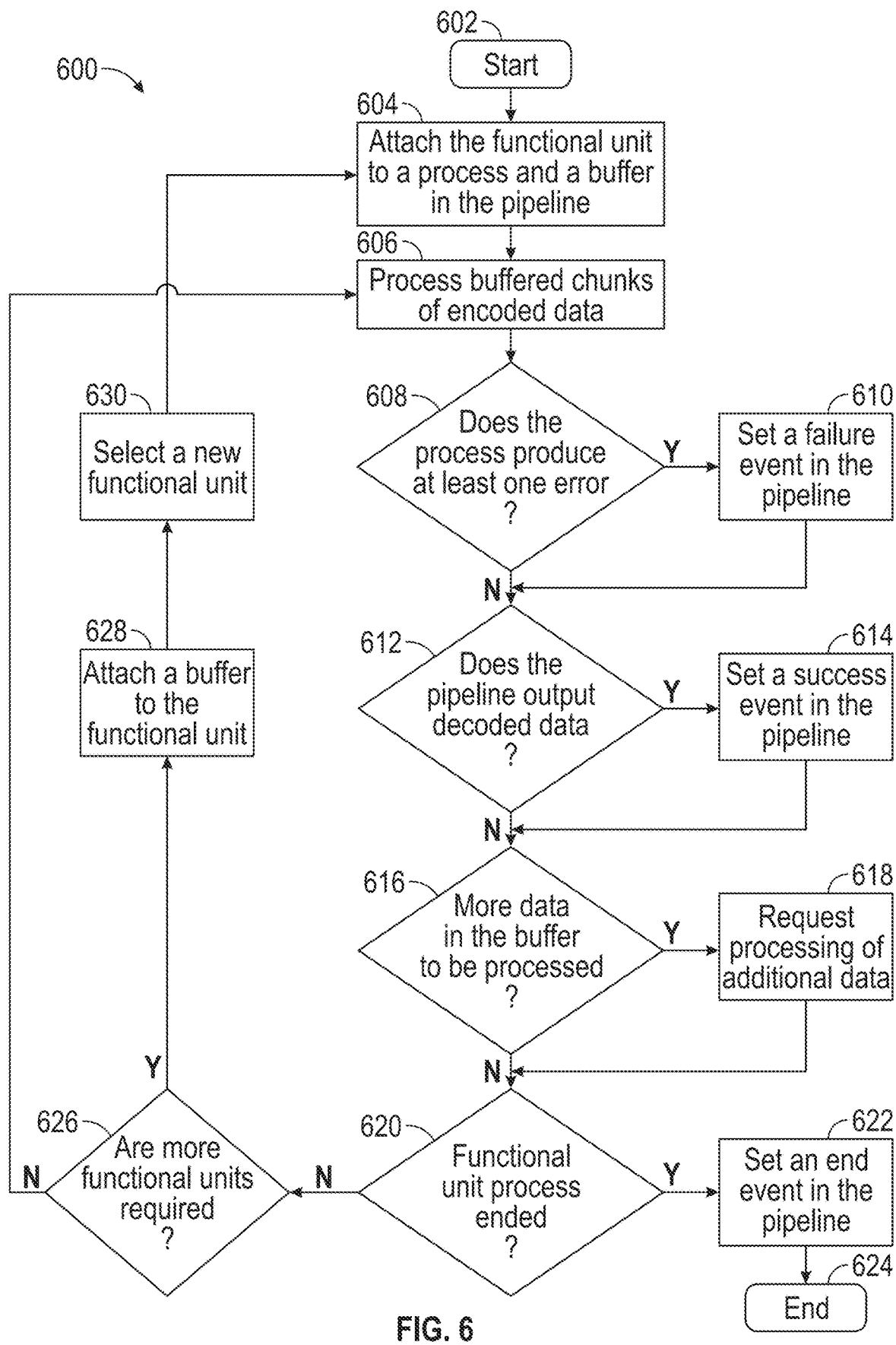
FIG. 6 is another flowchart illustrating another method for generating an accessor pipeline, in accordance with some example embodiments.

FIG. 6 illustrates a flowchart 600 of a local optimization process for accessing encoded digital data, in accordance with some example embodiments. The acts of flowchart 600 may, for example, be performed in whole or in part within the acts 510 and 512 of FIG. 5. Flowchart 600 starts at start block 602 and advances to block 604, which includes attaching the selected functional unit to a process and a buffer in the pipeline.

Flowchart 600 advances from block 604 to block 606, which includes processing buffered chunks of encoded data. The method then advances through several performance testing stages. Blocks 608, 612, 616, 620 and 626 are example testing decision points related to successful assembly of all or part of an accessor pipeline. All or a subset of blocks 608, 612, 620, 626 may be performed in the illustrated order, or a different order, in parallel, and alone or in combination with one or more additional conditions.

In this example, flowchart 600 advances from block 606 to block 608, which includes determining whether the process produces at least one error. If the current functional unit used to process the encoded digital data produces one or more errors or warnings, flowchart 600 advances from block 608 to block 610, which includes setting a failure event in the pipeline. For example, accessor functional unit selector 464 may be configured to set a failure event as a part of testing process(es) 440, e.g., accessor functional unit selector 464 is informed of the error(s) by the accessor functional unit and pipeline tester 474 (which may have received an error output from a functional unit 304 as described above with reference to FIG. 3A) and, depending on the criticality of the error, accessor functional unit selector 464 determines whether to continue the functional unit testing process or abort. The response of the accessor functional unit selector 464 to various error codes or messages received from the accessor functional unit and pipeline tester 474 can be guided by information in the knowledge base 420 or by user input. If the current functional unit does not produce errors or warnings of sufficient severity to stop the pipeline generation process, flowchart 600 advances from block 608 to block 612, which includes determining whether currently assembled pipeline or pipeline portion outputs decoded data. If the determination is made that the currently assembled pipeline does not output decoded data, flowchart 600 advances from block 612 to block 616. If the determination is made that the currently assembled pipeline outputs decoded data, flowchart 600 advances from block 612 to block 614, which includes setting a success event in the pipeline and then advances to block 616.

At block 616, a determination is made whether more encoded data is buffered for processing. If it is determined that the functional unit(s) under test require more data to be decoded, flowchart 600 advances from block 616 to block 618, which includes requesting processing of additional data. Flowchart 600 advances from block 618 to block 620. At block 620 a determination is made whether the functional unit process has ended. For example, accessor functional unit and pipeline tester 474 may be configured to make such a determination in response to receiving a signal indicating that all encoded digital data has been processed by the functional unit under test or a signal indicating that the functional unit under test, itself, detected an end of stream in encoded digital data 124. If a determination is made that the functional process has ended successfully, flowchart 600 advances from block 620 to block 622, which includes setting an end event in the pipeline. For example, an end event flag may be set such that accessor functional unit selector 464 or accessor functional unit and pipeline tester 474, depending on its/their configuration or user intention, determines whether building accessor pipeline succeeded. Information that accessor functional unit selector 464 and/or accessor functional unit and pipeline tester 474 may be configured to consider or utilize in such a determination includes, but is not limited to, the indication(s) that no error or significant warning was raised by the process (e.g., block 610 was not executed) and that a decoded digital stream has been output to an output buffer during the decoding process (e.g., block 614 was executed). However, if a determination that the functional process has ended successfully is not made, flowchart 600 advances from block 620 to block 626, which includes determining whether a new functional unit is required to complete testing and/or processing being carried out by the instant functional unit. Information accessor functional unit selector 464 and/or accessor functional unit and pipeline tester 474 may be configured to consider and/or utilize in determining whether to add a new functional unit to accessor pipeline includes, but is not limited to, information about the content of encoded digital data 124 or an indication that the selected functional unit requires a new functional unit (e.g., an accessor/decoder) to handle a type of content of encoded digital data 124. If another functional unit needs to be added in pipeline due, for example, to incomplete processing or yet unprocessable encoded data still in the buffer, flowchart 600 advances from block 626 to block 628, which includes attaching yet another buffer to the currently-tested functional unit. Flowchart 600 advances from block 628 to block 630, which includes selecting a new functional unit. Flowchart 600 then proceeds from block 630 back to block 604 and the new functional unit is integrated into pipeline, initialized and tested substantially as previously described for the initial functional unit. Since, in some embodiments, the new functional unit was selected in block 630 based on an indication of its requirement to provide decoded/interpreted data to the initial functional unit, testing of the initial functional unit may continue in series or parallel with processing and/or testing of the additional functional unit upon receipt of the required decoded/interpreted data from the new functional unit process. Accordingly, in some such embodiments, an input or output buffer of one of the initial functional unit and the new functional unit may be assigned, mapped or otherwise correspond to a respective output or input buffer of the other of the initial functional unit and the new functional unit to facilitate the transfer of data from desired source to desired sink in the testing process.

In some embodiments, there is more than one functional unit that can perform a desired accessing function inside a given accessing pipeline. In these cases, an accessor functional element selector 464 and accessor functional unit connector 468 may be configured to create or assign a new buffer, copy the previous partial pipeline to the new buffer, and continues in parallel with the previous partial pipeline in it's initial buffer. In some embodiments, a final verification and selection step may be performed to determine which successful of multiple parallel tested accessor pipelines to use subject to criteria such as size, efficiency, and user preference, which criteria may be incorporated as selection rules in the knowledge database 420.

Figure 7:
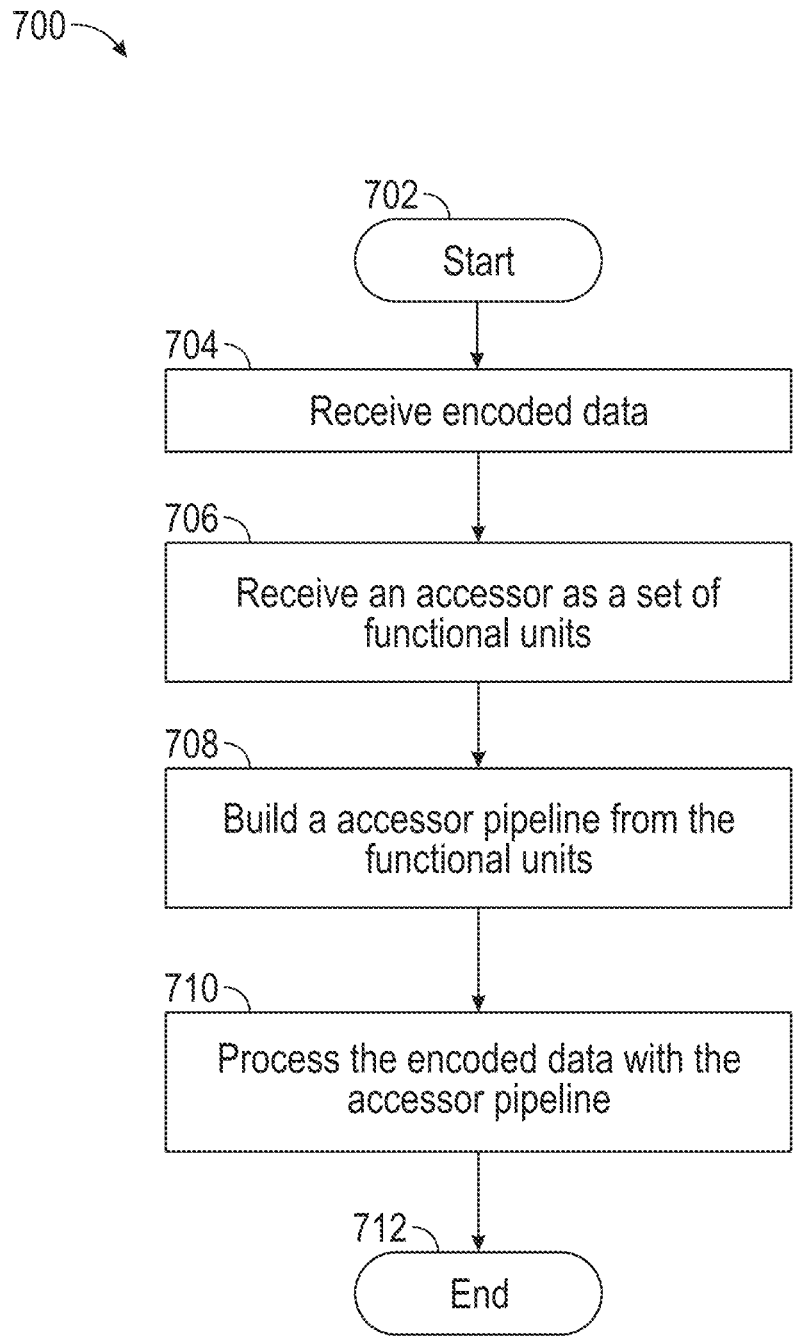
FIG. 7 is a flowchart illustrating a method for accessing encoded digital data, in accordance with some example embodiments.

FIG. 7 illustrates a flowchart 700 of accessing encoded data, in accordance with some example embodiments. In some embodiments, one or more blocks of flowchart 700 may be performed by instructions included in or accessible by processing circuitry 210, memory 230, and/or additional hardware 240, of encoding/accessing computer systems 105, 110 shown in FIG. 2.

Flowchart 700 begins at "start" block 702 and advances to block 704, which includes receiving encoded digital data. Flowchart 700 advances from block 704 to block 706, which includes receiving an accessor as a set of functional units or potentially functional unit descriptors. In some embodiments, the set of functional units or functional unit descriptors 126 may be received, retrieved, or otherwise obtained with encoded data 124 in a container 122 as described above with reference to FIG. 1. In some embodiments, the set of functional units or functional unit descriptors 126 may be stored and/or received across more than one file or container. In some embodiments, the set of functional units or functional unit descriptors 126 may be retrieved and/or received from a local cache, or from a remote location via, for example, the internet or any other suitable electronic network.

Flowchart 700 advances from block 706 to block 708, which includes building an accessor pipeline from the functional units. For example, accessing computer system 110 may be configured to build an accessor pipeline utilizing the functional units or functional unit descriptors 126. In some embodiments, building the accessor pipeline may comprise associating one or more processes and one or more buffers to functional units 126 that ultimately form the accessor pipeline. Flowchart 700 advances from block 708 to block 710, which includes processing the encoded data with the accessor pipeline constructed.

Because functional units 126 are self-contained and platform-independent, a user may also replace one or more of functional units 126, e.g., while interacting with the decoded, interpreted and/or otherwise presented digital data in, for example, a browser by simply selecting a replacement functional unit from a displayed list of alternative functional unit options. Accordingly, in such embodiments, such functional unit replacement procedures may be performed and pipeline 450 may be immediately functional without a requirement for recompilation or rebuilding of pipeline 450.

Example—Browser Playback

In this example, custom HTML tags, extensions, and/or attributes are used to designate functional unit libraries or other aspects of the accessor pipeline generation schemes described herein. With the HTML 5 specifications, the <video> and <audio> tags extended browser support with a native solution for embedding video and audio content. However, support for video and audio is still limited to a handful of container and underlying encoding formats. Mobile browsers may support some formats optimized for their characteristics that are not supported by their desktop equivalents; conversely, mobile browsers may not support all the same formats the desktop version does. On top of that, both desktop and mobile browsers may be designed to offload handling of media playback. It means that any terminal's media support is partly dependent on what software the user has installed. It also turns out that several popular formats are encumbered by patents, and browsers that wish to implement support for those codecs must pay license fees.

In one embodiment of the technology described herein, the native HTML tags <img>, <audio>, <video>, and <canvas> are extended with new attributes is, using and with, that inform the browser on the manner to handle the content. For example, DNG is an image format developed by Adobe and typically used for digital photography. It provides many features, a significant collection of metadata, previewing, and great flexibility with no visual alteration. Adobe's license allows use of this format without cost on the condition that the licensee prominently displays text saying it is licensed from Adobe. Despite its advantages, it is not yet natively supported by general public browsers through the <img> tag. With the principles described herein, Web Developers can add support for DNG images to a browser using the is="universal-img" attribute as follows:

<img src="camera_photo.dng" is="universal-img" using="multi-img.wasm" with=["LibRaw.wasm"]>The is attributes indicates that, instead of using a native <img> tag, the browser should make use an extended version of this tag, for which the attributes using and with will be used for handling such content.

the using attribute

DNG provides many specific features compared to common image format, including Exif metadata, XMP metadata, IPTC metadata, CIE XYZ coordinates and JPEG preview. The using="multi-img.wasm" enhances the current <img> tag with new methods to easily retrieve these information from the file, e.g., XMP_metadata( ), IPTC_metadata( ), JPEG_preview( ). It also provides for professional image manipulation methods typically performed by a raw converter, such as white balance, the application of a camera color profile, HDR compositing, etc.

the with attribute:

Many cameras use proprietary variation of DNG, which are frequently incompatible with each other. The with attribute indicates the library that handles the given content. In this example, we illustrate the use the opensource LibRaw library, which exposes a wide range of camera and format support when dealing with raw images.

Both attributes, libraries and new features are encapsulated in the given tag with no dependencies, beyond WASM, asm.js, or other comparable platform-independent support, from the webpage or the underlying browser, making this extended support future-proof and widely portable.

General Interpretive Principles

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, a system or an apparatus may be implemented, or a method may be practiced using any one or more of the aspects set forth herein. In addition, the scope of the disclosure is intended to cover such a system, apparatus or method which is practiced using other structure, functionality, or structure and functionality in addition to or other than the various aspects of the disclosure set forth herein. It should be understood that any aspect disclosed herein may be set forth in one or more elements of a claim. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

With respect to the use of plural vs. singular terms herein, those having skill in the art can translate from the plural to the singular and/or from the singular to the plural as is appropriate to the context and/or application. The various singular/plural permutations may be expressly set forth herein for sake of clarity.

When describing an absolute value of a characteristic or property of a thing or act described herein, the terms "substantial," "substantially," "essentially," "approximately," and/or other terms or phrases of degree may be used without the specific recitation of a numerical range. When applied to a characteristic or property of a thing or act described herein, these terms refer to a range of the characteristic or property that is consistent with providing a desired function associated with that characteristic or property.

In those cases where a single numerical value is given for a characteristic or property, it is intended to be interpreted as at least covering deviations of that value within one significant digit of the numerical value given.

If a numerical value or range of numerical values is provided to define a characteristic or property of a thing or act described herein, whether or not the value or range is qualified with a term of degree, a specific method of measuring the characteristic or property may be defined herein as well. In the event no specific method of measuring the characteristic or property is defined herein, and there are different generally accepted methods of measurement for the characteristic or property, then the measurement method should be interpreted as the method of measurement that would most likely be adopted by one of ordinary skill in the art given the description and context of the characteristic or property. In the further event there is more than one method of measurement that is equally likely to be adopted by one of ordinary skill in the art to measure the characteristic or property, the value or range of values should be interpreted as being met regardless of which method of measurement is chosen.

It will be understood by those within the art that terms used herein, and especially in the appended claims (e.g., bodies of the appended claims) are intended as "open" terms unless specifically indicated otherwise (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

In those instances where a convention analogous to "at least one of A, B, and C" is used, such a construction would include systems that have A alone, B alone, C alone, A and B together without C, A and C together without B, B and C together without A, as well as A, B, and C together. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include A without B, B without A, as well as A and B together."

Various modifications to the implementations described in this disclosure can be readily apparent to those skilled in the art, and generic principles defined herein can be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The technology is operational with numerous other general-purpose or special purpose computing system environments or configurations. Examples of well-known computing systems, environments, and/or configurations that may be suitable for use with the technology disclosed herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN), personal area network (PAN), or Wide Area Network (WAN) may be a home or corporate computing network, including access to the Internet, to which computers and computing devices comprising the system are connected. In one embodiment, the LAN conforms to the Transmission Control Protocol/Internet Protocol (TCP/IP) industry standard.

As used herein, data and digital data refer to images, graphics, sounds, video, animations, electronic documents, scientific data, or any other digital data type data that is entered into the system.

As used herein, encoded digital data refers to data that are stored or held in a data format, which may be compressed or uncompressed.

As used herein, decode refers to decompression, interpretation, playback or conversion.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system is comprised of various modules/components as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

A web browser comprising a web browser user interface may be used to display information (such as textual and graphical information) to a user. The web browser may comprise any type of visual display capable of displaying information received via a network. Examples of web browsers include Microsoft's Internet Explorer browser, Netscape's Navigator browser, Mozilla's Firefox browser, PalmSource's Web Browser, Apple's Safari, or any other browsing or other application software capable of communicating with a network.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While the above description has pointed out novel features of the technology as applied to various embodiments, the skilled person will understand that various omissions, substitutions, and changes in the form and details of the device or process illustrated may be made without departing from the scope of the instant technology. Therefore, the scope of the technology is defined by the appended claims rather than by the foregoing description. All variations coming within the meaning and range of equivalency of the claims are embraced within their scope.

What is claimed is:

1. A data processing system for accessing encoded digital data, the data processing system comprising:
   an accessor pipeline generator comprising:
   an accessor functional unit selector configured to select one or more platform-independent accessor functional units from a plurality of platform-independent accessor functional units each configured to provide at least one function for accessing the encoded digital data;
   an accessor functional unit connector configured to connect selected platform-independent accessor functional units into an accessor pipeline; and
   a content renderer configured to generate a user interface through which data accessed with a generated accessor pipeline can be interacted with by a user.

2. The data processing system of claim 1, comprising a container storing the encoded digital data and an accessor pipeline generated by the accessor pipeline generator.

3. The data processing system of claim 1, wherein the accessor pipeline generator comprises an accessor functional unit and pipeline tester configured to test the performance of the accessor pipeline connected by the accessor functional unit connector.

4. The data processing system of claim 3, wherein the accessor functional unit selector, the accessor functional unit connector, and the accessor functional unit and pipeline tester are configured to repeatedly select, connect, and test connected sets of platform-independent functional units forming accessor pipelines.

5. The data processing system of claim 1, wherein the accessor pipeline generator is invokable by one or more HTML tags and/or tag attributes.

6. The data processing system of claim 1, wherein the accessor pipeline generator comprises a functional unit library comprising the plurality of accessor functional units selected from when generating the accessor pipeline.

7. The data processing system of claim 6, wherein the repeated selecting, connecting, and testing is performed in an exhaustive manner through the functional unit library.

8. The data processing system of claim 7, wherein the functional unit library is identified by one or more HTML tags and/or tag attributes.

9. The data processing system of claim 1, wherein the accessor pipeline generator is configured to remove previously selected platform-independent functional units from a connected accessor pipeline in response to a failing result of a functionality test of a connected accessor pipeline.

10. The data processing system of claim 3, wherein the accessor functional unit and pipeline tester is configured to receive encoded data and output data decoded by a connected set of platform-independent functional units forming an accessor pipeline.

11. The data processing system of claim 1, comprising at least one reference accessor.

12. The data processing system of claim 1, comprising a knowledge base accessible to the accessor functional unit selector.

13. The data processing system of claim 1, wherein the platform-independent functional units comprise or represent algorithms capable of accessing and/or decoding at least a portion of the encoded data.

14. The data processing system of claim 1, wherein the decoding functionality selector is configured to:
   receive user input related to a selection from the plurality of permitted platform-independent functional units; and
   iteratively select the one or more platform-independent functional units based at least in part on the user input.

15. A method of generating an accessor pipeline for accessing digital data, the method comprising:
   repeatedly selecting one or more platform-independent functional units from a plurality of platform-independent functional units each configured to provide at least one function of accessing the digital data;
   repeatedly connecting selected platform-independent functional units to generate accessor pipelines;
   repeatedly performing functionality testing of the generated accessor pipelines; and
   rendering data accessed with a generated accessor pipeline with a user interface.

16. The method of claim 15, comprising storing a generated accessor pipeline, or a representation of a generated accessor pipeline with data to be accessed in a container.

17. The method of claim 15, comprising removing selected platform-independent functional units from a generated accessor pipeline in response to a failing result of a functionality test of the generated accessor pipeline.

18. The method of claim 15, comprising displaying data accessed with a generated accessor pipeline on an electronic display.

19. The method of claim 15, wherein the platform-independent functional units comprise or otherwise represent algorithms capable of accessing and/or decoding encoded data.

20. The method of claim 15, comprising:
   receiving user input related to a selection from the plurality of permitted platform-independent functional units; and
   selecting one or more platform-independent functional units based at least in part on the user input.

21. The method of claim 15, comprising invoking the method of an HTML tag, extension, and/or attribute.

22. The method of claim 15, comprising selecting one or more platform independent functional units based at least in part on an HTML tag, extension, and/or attribute.

23. A method of decoding encoded digital data, the method comprising executing an HTML tag comprising an attribute that specifies a library of platform-independent decoding functional units to be accessed for building a decoding pipeline that decodes the encoded digital data.

* * * * *